(12) United States Patent
Kobayashi et al.

(10) Patent No.: US 10,727,784 B2
(45) Date of Patent: Jul. 28, 2020

(54) AGGREGATION SYSTEM, CONTROL METHOD THEREOF, AND CONTROL APPARATUS

(71) Applicants: HITACHI, LTD., Tokyo (JP); IKS CO., LTD., Kyoto (JP)

(72) Inventors: Hideki Kobayashi, Tokyo (JP); Kouichi Hiraoka, Tokyo (JP); Mitsumasa Takayama, Tokyo (JP); Jun Takahashi, Tokyo (JP); Yuji Fujiki, Tokyo (JP); Takashi Imai, Kyoto (JP)

(73) Assignees: HITACHI, LTD., Tokyo (JP); IKS CO., LTD., Kyoto (JP)

( * ) Notice: Subject to any disclaimer, the term of this patent is extended or adjusted under 35 U.S.C. 154(b) by 0 days.

(21) Appl. No.: 16/327,348

(22) PCT Filed: Aug. 23, 2017

(86) PCT No.: PCT/JP2017/030190
§ 371 (c)(1),
(2) Date: Feb. 22, 2019

(87) PCT Pub. No.: WO2018/038176
PCT Pub. Date: Mar. 1, 2018

(65) Prior Publication Data
US 2019/0199129 A1    Jun. 27, 2019

(30) Foreign Application Priority Data
Aug. 23, 2016  (JP) .................. 2016-162857

(51) Int. Cl.
*H02S 40/38*    (2014.01)
*H02J 3/14*    (2006.01)
(Continued)

(52) U.S. Cl.
CPC ............. *H02S 40/38* (2014.12); *B60L 50/61* (2019.02); *B60L 53/11* (2019.02); *B60W 10/24* (2013.01);
(Continued)

(58) Field of Classification Search
CPC .. B60W 10/24; B60W 10/26; B60W 2710/24; B60W 20/40; B60L 2210/20;
(Continued)

(56) References Cited

U.S. PATENT DOCUMENTS 8,504,227 B2 * 8/2013 Ichishi ................ B60L 50/16
701/22
8,666,572 B2 * 3/2014 Mitsutani ............. B60K 1/02
701/22
(Continued)

FOREIGN PATENT DOCUMENTS

JP    2015-011408 A    1/2015
JP      5905836 B2     4/2016
(Continued)

OTHER PUBLICATIONS

International Search Report of PCT/JP2017/030190 dated Sep. 26, 2017.
(Continued)

*Primary Examiner* — Crystal J Barnes-Bullock
(74) *Attorney, Agent, or Firm* — Mattingly & Malur, PC

(57) ABSTRACT

In an aggregation system comprising a control apparatus which is provided for each consumer and a server apparatus, the server apparatus calculates, for each of the consumers and as an allocation amount of the consumer, an upper limit value for the power which the consumer inputs from the system or a lower limit value for the power which the consumer is to output to the system, according to a requested power provision amount, and sends the respective control
(Continued)

instructions designating the calculated allocation amount of each consumer to the control apparatus of the consumer, and the control apparatuses each control the charging and discharging of the corresponding power apparatus so that the power input from the system is equal to or smaller than the allocation amount designated in the control instruction or so that power equal to or larger than the allocation amount is output to the system.

7 Claims, 24 Drawing Sheets

(51) Int. Cl.
| | |
|---|---|
| H02J 3/32 | (2006.01) |
| H02J 3/46 | (2006.01) |
| H02J 13/00 | (2006.01) |
| H02J 3/38 | (2006.01) |
| H02S 50/00 | (2014.01) |
| H02S 10/12 | (2014.01) |
| H02S 40/32 | (2014.01) |
| H02J 4/00 | (2006.01) |
| H02J 1/14 | (2006.01) |
| H02J 15/00 | (2006.01) |
| B60W 10/24 | (2006.01) |
| H02J 7/00 | (2006.01) |
| H02J 50/00 | (2016.01) |
| B60L 50/61 | (2019.01) |
| B60W 10/26 | (2006.01) |
| H02M 7/00 | (2006.01) |
| B60W 20/00 | (2016.01) |
| B60L 53/10 | (2019.01) |

(52) U.S. Cl.
CPC ............ *B60W 10/26* (2013.01); *B60W 20/00* (2013.01); *H02J 1/14* (2013.01); *H02J 3/14* (2013.01); *H02J 3/32* (2013.01); *H02J 3/38* (2013.01); *H02J 3/46* (2013.01); *H02J 4/00* (2013.01); *H02J 7/00* (2013.01); *H02J 13/00* (2013.01); *H02J 13/00001* (2020.01); *H02J 15/00* (2013.01); *H02J 50/001* (2020.01); *H02M 7/00* (2013.01); *H02S 10/12* (2014.12); *H02S 40/32* (2014.12); *H02S 50/00* (2013.01); *B60L 2210/20* (2013.01); *B60L 2210/30* (2013.01); *B60L 2210/40* (2013.01); *B60W 2710/24* (2013.01); *H02J 2310/14* (2020.01); *Y02B 70/1441* (2013.01); *Y02B 70/3225* (2013.01); *Y02E 40/72* (2013.01); *Y02E 60/721* (2013.01); *Y02T 10/7005* (2013.01); *Y02T 10/725* (2013.01); *Y02T 10/7216* (2013.01); *Y02T 10/7241* (2013.01); *Y02T 90/16* (2013.01); *Y02T 90/168* (2013.01); *Y02T 90/169* (2013.01); *Y04S 10/12* (2013.01); *Y04S 10/126* (2013.01); *Y04S 20/222* (2013.01); *Y04S 30/12* (2013.01); *Y04S 30/14* (2013.01); *Y04S 50/16* (2018.05)

(58) Field of Classification Search
CPC ............ B60L 2210/30; B60L 2210/40; B60L 2240/486; B60L 50/61; B60L 53/11; Y02T 10/6286; Y02T 10/7241; Y02T 10/725; Y02B 70/1441; H02J 1/14; H02J 3/381; H02J 3/382; H02J 3/383; H02J 3/386; H02J 4/00; H02J 7/00; H02J 9/061; H02J 9/062; H02J 9/068; H02J 15/00; H02J 50/001; H04S 10/12; H04S 40/32; H04S 40/68
See application file for complete search history.

(56) References Cited

U.S. PATENT DOCUMENTS

| | | | | |
|---|---|---|---|---|
| 10,183,583 B2* | 1/2019 | Narla | ...................... | H02M 7/48 |
| 10,211,640 B2* | 2/2019 | Dent | ....................... | H02M 7/00 |
| 2010/0145589 A1* | 6/2010 | Kobayashi | .............. | B60L 50/61 |
| | | | | 701/93 |
| 2014/0012427 A1 | 1/2014 | Katayama et al. | | |
| 2018/0152131 A1* | 5/2018 | Vidhi | ...................... | F03D 9/255 |
| 2018/0248376 A1* | 8/2018 | Teramoto | ............. | H02J 7/0014 |
| 2020/0006954 A1* | 1/2020 | Miyata | ...................... | H02J 7/00 |
| 2020/0021236 A1* | 1/2020 | Pan | ......................... | H02J 3/382 |

FOREIGN PATENT DOCUMENTS

| | | |
|---|---|---|
| JP | 2016-135040 A | 7/2016 |
| WO | 2011/102855 A1 | 8/2011 |

OTHER PUBLICATIONS

Extended European Search Report received in corresponding European Application No. 17843654.9 dated Feb. 20, 2020.

* cited by examiner

FIG.4

FUTURES INFORMATION

| ITEM | | CONFIGURED NUMERICAL EXAMPLE | SEND TO AGGREGATION SERVER | EMS REGISTRATION |
|---|---|---|---|---|
| OPERATION PATTERN | CURRENT DAY | EX2 | ○ | ○ |
| | NEXT DAY | EX3 | ○ | ○ |
| | SECOND DAY | EX6 | ○ | ○ |
| | THIRD DAY | EX6 | ○ | ○ |
| | FOURTH DAY | EX6 | ○ | ○ |
| | FIFTH DAY | EX6 | ○ | ○ |
| | SIXTH DAY | EX3 | ○ | ○ |

FIG.5

PERFORMANCE INFORMATION (SEND COLLECTED INFORMATION FROM 0:00 TO 24:00 ONCE A DAY)

| | ITEM | UNITS | SEND TO AGGREGATION SERVER | EMS REGISTRATION | REMARKS |
|---|---|---|---|---|---|
| PV | POWER GENERATION AMOUNT | kWh | ○ | ○ | |
| STORAGE CELL | CHARGED POWER AMOUNT | kWh | | ○ | |
| | DISCHARGED POWER AMOUNT | kWh | | ○ | |
| | CURRENT POWER AMOUNT AT 0:00 | kWh | | ○ | |
| | CURRENT POWER AMOUNT AT 24:00 | kWh | | ○ | |
| EV | CHARGED POWER AMOUNT | kWh | | ○ | |
| | DISCHARGED POWER AMOUNT | kWh | | ○ | |
| | CURRENT POWER AMOUNT AT 0:00 | kWh | | ○ | |
| | CURRENT POWER AMOUNT AT 24:00 | kWh | | ○ | |
| SYSTEM | SYSTEM INPUT POWER AMOUNT | kWh | ○ | ○ | |
| | SYSTEM DISCHARGED POWER AMOUNT | kWh | ○ | ○ | |
| | VOLTAGE CONTROLLED POWER ADJUSTMENT AMOUNT | kWh | ○ | ○ | |
| | FREQUENCY CONTROLLED POWER ADJUSTMENT AMOUNT | kWh | ○ | ○ | |
| | REACTIVE POWER ADJUSTMENT AMOUNT | kVarh | ○ | ○ | |
| LOAD | USED POWER AMOUNT | kWh | ○ | ○ | |
| HISTORY | INITIAL OPERATION PATTERN | | ○ | ○ | |
| | POST-CHANGE PATTERN | | ○ | ○ | |
| | CHANGE TIME | | ○ | ○ | |
| | AMOUNT DISCHARGED BY MEANS OF CONTROL INSTRUCTION | kWh/DAY | ○ | ○ | DISCHARGING ADJUSTMENT AMOUNT |
| | AMOUNT CHARGED BY MEANS OF CONTROL INSTRUCTION | kWh/DAY | ○ | ○ | CHARGING ADJUSTMENT AMOUNT |

FIG.6

PERIOD INFORMATION

| | ITEM | UNITS | REMARKS |
|---|---|---|---|
| PV | POWER GENERATION AMOUNT | kWh | |
| STORAGE CELL | CHARGED POWER AMOUNT | kWh | |
| | DISCHARGED POWER AMOUNT | kWh | |
| | PREVIOUS POWER AMOUNT | kWh | |
| | CURRENT POWER AMOUNT | kWh | |
| | PREVIOUS SOC | % | |
| | CURRENT SOC | % | |
| EV | CHARGED POWER AMOUNT | kWh | |
| | DISCHARGED POWER AMOUNT | kWh | |
| | PREVIOUS POWER AMOUNT | kWh | |
| | CURRENT POWER AMOUNT | kWh | |
| | PREVIOUS SOC | % | |
| | CURRENT SOC | % | |
| | EV COUPLING | YES/NO | |
| SYSTEM | SYSTEM INPUT POWER AMOUNT | kWh | |
| | SYSTEM DISCHARGED POWER AMOUNT | kWh | |
| | PREDICTION VALUE FOR SYSTEM POWER CONTROL BY DISCHARGING STORAGE CELL (INCLUDING EV STORAGE CELL) | kW | USE DURING PEAK POWER OF PEAK CUT AND PEAK SHIFT |
| | PREDICTION VALUE FOR SYSTEM POWER INCREASE BY CHARGING STORAGE CELL (INCLUDING EV STORAGE CELL) | kW | USE DURING POWER CONSERVATION OF PEAK SHIFT |
| | VOLTAGE CONTROLLED POWER ADJUSTMENT AMOUNT | kWh | |
| | FREQUENCY CONTROLLED POWER ADJUSTMENT AMOUNT | kWh | |
| | REACTIVE POWER ADJUSTMENT AMOUNT | kVarh | |
| | SYSTEM VOLTAGE | V | |
| | SYSTEM FREQUENCY | Hz | |
| | USED POWER AMOUNT | kWh | |
| HISTORY | PREVIOUS MAXIMUM CAPACITY | kWh | |
| | PREVIOUS CAPACITY | kWh | |
| | CURRENT MAXIMUM CAPACITY | kWh | |
| | CURRENT CAPACITY | kWh | |
| | PREVIOUS OPERATION PATTERN | | |
| | CURRENT OPERATION PATTERN | | |
| | DR WORK /STANDBY | | |
| | CHANGE TIME | | |
| | MEASUREMENT TIME | | |
| | AMOUNT DISCHARGED BY MEANS OF CONTROL INSTRUCTION | kWh/ TIME INTERVAL | |
| | AMOUNT CHARGED BY MEANS OF CONTROL INSTRUCTION | kWh/ TIME INTERVAL | |
| | DISCHARGEABLE AMOUNT | kWh | |
| | CHARGEABLE AMOUNT | kWh | |

FIG.8

INITIAL REGISTRATION INFORMATION FOR EACH CONSUMER

| | ITEM | UNITS | AGGREGATION SERVER TRANSMISSION | EMS REGIS- TRATION | REMARKS |
|---|---|---|---|---|---|
| CON- TRACT PARTY | REGISTRATION DATE | SEIREKI (WESTERN CALENDAR), YEAR/ MONTH/ DAY | ◯ | | |
| | PERSONAL ID | | ◯ | | |
| | NAME | | ◯ | | |
| | POSTAL CODE | | ◯ | | |
| | CITY | | ◯ | | |
| | TELEPHONE NUMBER | | ◯ | | |
| | E-mail | | ◯ | | |
| CON- TRACT POWER | POWER COMPANY NAME | | ◯ | | |
| | PLAN NAME | | ◯ | | |
| | CAPACITY | AMPERES | ◯ | | |
| | CONTRACT DATE | SEIREKI (WESTERN CALENDAR), YEAR/ MONTH/ DAY | ◯ | | |
| | SPECIAL ITEMS | | ◯ | | |
| UNIT | MODEL | | ◯ | | |
| | INSTALLATION MONTH/YEAR | SEIREKI (WESTERN CALENDAR), YEAR/ MONTH/ DAY | ◯ | | |
| | SINGLE-PHASE OR THREE-PHASE | | ◯ | | |
| | RATED OUTPUT | kVA | ◯ | | |
| | AC INPUT (VOLTAGE) | V | ◯ | | |
| | AC INPUT (FREQUENCY) | Hz | ◯ | | |
| | BUILT-IN STORAGE CELL TYPE | | ◯ | | |
| | BUILT-IN STORAGE CELL MAXIMUM POWER | kW | | ◯ | |
| | BUILT-IN STORAGE CELL CAPACITY | kWh | | ◯ | |
| | EV STORAGE CELL MAXIMUM POWER | kW | | ◯ | |
| | EV STORAGE CELL CAPACITY | kW | | ◯ | |
| | PV MAXIMUM POWER | kW | | ◯ | |
| DR CONFIG- URATION | EV CHARGED POWER AMOUNT | kWh | | ◯ | |
| | EV DISCHARGED POWER AMOUNT | kWh | | ◯ | |
| | SYSTEM USAGE POWER MAXIMUM VALUE | kW | | ◯ | |
| | EV STORAGE CELL SOC LOWER LIMIT VALUE | % | | ◯ | 0~100% |
| | EV STORAGE CELL SOC UPPER LIMIT VALUE | % | | ◯ | 0~100% |
| | BUILT-IN STORAGE CELL DISCHARGED POWER VALUE | kW | | ◯ | |
| | BUILT-IN STORAGE CELL CHARGED POWER VALUE | kW | | ◯ | |
| | BUILT-IN STORAGE CELL SOC LOWER LIMIT VALUE | % | | ◯ | 0~100% |
| | BUILT-IN EV STORAGE CELL SOC UPPER LIMIT VALUE | % | | ◯ | 0~100% |
| | CHARGING-DISCHARGING PRIORITY RANKING OF EV STORAGE CELL, BUILT-IN STORAGE CELL | | | ◯ | |
| | MAXIMUM DISCHARGEABLE AMOUNT | kWh | | ◯ | |
| | MAXIMUM CHARGEABLE AMOUNT | kWh | | ◯ | |

FIG.9

POSSIBLE OUTPUT VALUE MANAGEMENT TABLE 73

| ID | CURRENT OUTPUT (kW) | DIS-CHARGEABLE CAPACITY (kWh) | SUPPRESSIBLE POWER (kW) BY DISCHARGING STORAGE CELL AND EV IN EACH CONTINUOUS INTERVAL FROM THE CURRENT TIME 73D | | | | | | |
|---|---|---|---|---|---|---|---|---|---|
| | | | 30 MINUTES | 60 MINUTES | 90 MINUTES | 120 MINUTES | 150 MINUTES | 180 MINUTES | ... |
| HPCS0000001 | 6 | 30 | 0 | 0 | 0 | 0 | 0 | 0 | ... |
| HPCS0000002 | 6 | 12 | 0 | 0 | 0 | 0 | 0 | 0 | ... |
| HPCS0000003 | 6 | 25 | 0 | 0 | 0 | 0 | 0 | 0 | ... |
| HPCS0000004 | 6 | 26 | 0 | 0 | 0 | 0 | 0 | 0 | ... |
| HPCS0000005 | 0 | 16 | 6 | 6 | 6 | 6 | 6 | 6 | ... |
| HPCS0000006 | 10 | 5 | 5 | 0 | 0 | 0 | 0 | 0 | ... |
| HPCS0000007 | 0 | 22 | 10 | 10 | 10 | 10 | 10 | 10 | ... |
| HPCS0000008 | 10 | 33 | 0 | 0 | 0 | 0 | 0 | 0 | ... |
| ... | ... | ... | ... | ... | ... | ... | ... | ... | ... |
| 73A | 73B | 73C | 73E | 73E | 73E | 73E | 73E | 73E | |

FIG.10

POSSIBLE INPUT VALUE MANAGEMENT TABLE

| ID | CURRENT INPUT (kW) | CHARGEABLE CAPACITY (kWh) | USABLE POWER (kW) BY CHARGING STORAGE CELL AND EV IN EACH CONTINUOUS INTERVAL FROM THE CURRENT TIME | | | | | | |
|---|---|---|---|---|---|---|---|---|---|
| | | | 30 MINUTES | 60 MINUTES | 90 MINUTES | 120 MINUTES | 150 MINUTES | 180 MINUTES | ... |
| HPCS0000001 | 6 | 20 | 6 | 6 | 6 | 6 | 6 | 6 | ... |
| HPCS0000002 | 6 | 18 | 3 | 3 | 3 | 3 | 3 | 3 | ... |
| HPCS0000003 | 6 | 13 | 6 | 6 | 6 | 6 | 6 | 3 | ... |
| HPCS0000004 | 6 | 26 | 6 | 6 | 6 | 6 | 6 | 6 | ... |
| HPCS0000005 | 0 | 12 | 6 | 6 | 6 | 6 | 6 | 6 | ... |
| HPCS0000006 | 10 | 15 | 10 | 10 | 10 | 10 | 10 | 10 | ... |
| HPCS0000007 | 0 | 20 | 10 | 10 | 10 | 10 | 10 | 10 | ... |
| HPCS0000008 | 10 | 22 | 10 | 10 | 10 | 10 | 10 | 10 | ... |
| ... | ... | ... | ... | ... | ... | ... | ... | ... | ... |

FIG.11

PERFORMANCE VALUE TABLE

| ID | DATE | START TIME | END TIME | DISCHARGING ADJUSTMENT AMOUNT (kWh) | CHARGING ADJUSTMENT AMOUNT (kWh) |
|---|---|---|---|---|---|
| HPCS0000001 | 2015/8/1 | 13:00 | 13:30 | 3 | |
| HPCS0000002 | 2015/8/1 | 13:00 | 13:30 | 3 | |
| HPCS0000003 | 2015/8/1 | 13:00 | 13:30 | 3 | |
| HPCS0000004 | 2015/8/1 | 13:00 | 13:30 | | |
| HPCS0000005 | 2015/8/1 | 13:30 | 14:00 | | 3 |
| HPCS0000006 | 2015/8/1 | 13:30 | 14:00 | | 3 |
| HPCS0000007 | 2015/8/1 | 13:30 | 14:00 | | 3 |
| HPCS0000008 | 2015/8/1 | 13:30 | 14:00 | | 3 |

CONTROL UNITS

| IDENTIFIER | FUNCTION | | POWER FLOW |
|---|---|---|---|
| i | INPUT | SYSTEM | ⑦→⑤→④→③ |
| ii | | PV | ①→②→③ |
| iii | CHARGING | EV CHARGING | ③→⑨→⑧ |
| iv | | STORAGE CELL CHARGING | ③→⑪→⑩ |
| v | OUTPUT | SYSTEM | ③→④→⑤→⑦ |
| vi | | AC OUTLET | ⑦→⑤→⑫ |
| vii | | INDEPENDENT TERMINAL | DURING POWER OUTAGE③→④→⑬ |
| viii | | UPS OUTPUT | ③→⑭ |
| ix | DISCHARGING | EV DISCHARGING | ⑧→⑨→③ |
| x | | STORAGE CELL DISCHARGING | ⑩→⑪→③ |

FIG.13

CONTROL MODES AND CONTROL UNIT COMBINATIONS

| | | CONTROL FUNCTION | CONTROL UNIT COMBINATION |
|---|---|---|---|
| a | H-PCS ENERGY STORAGE CONTROL MODE | PV + SYSTEM → STORAGE CELL | (i + ii) CONTROL PRIORITIZING ii → iv |
| b | | PV + SYSTEM → EV | (i + ii) CONTROL PRIORITIZING ii → iii |
| c | | PV + SYSTEM → STORAGE CELL + EV | (i + ii) CONTROL PRIORITIZING ii → (iii + iv RATIO CONTROL) |
| d | | PV → SYSTEM + STORAGE CELL | ii CONTROL → (v + iv RATIO CONTROL) |
| e | H-PCS ENERGY DIS-CHARGING CONTROL MODE | PV + EV + STORAGE CELL → SYSTEM | CONTROL PRIORITIZING ii + (ix + x RATIO CONTROL) → v |
| f | | PV + EV → SYSTEM + STORAGE CELL | ix CONTROL PRIORITIZING ii → v + iv |
| g | | PV + STORAGE CELL → SYSTEM + EV | x CONTROL PRIORITIZING ii → v + iii |
| h | INDE-PENDENT CONTROL MODE | PV + EV + STORAGE CELL → INDEPENDENT | CONTROL PRIORITIZING ii + (ix + x RATIO CONTROL) → vii |
| i | | PV → INDEPENDENT + STORAGE CELL + EV | ii → (vii + (iii + iv RATIO CONTROL)) |
| j | | PV + STORAGE CELL → INDEPENDENT + EV | CONTROL OF x PRIORITIZING ii → iii + vii |
| k | | PV + EV → INDEPENDENT + STORAGE CELL | CONTROL OF ix PRIORITIZING ii → iv + vii |
| l | REACTIVE POWER CONTROL | | CONTROL PRIORITIZING ii + (ix + x RATIO CONTROL) → v |

FIG.14

EXAMPLE OF SINGLE-DAY TIME SCHEDULE

|     | TIME ZONE | START TIME | END TIME |
|-----|-----------|------------|----------|
| (1) | THE EARLY HOURS | 0:00 | 5:00 |
| (2) | EARLY MORNING | 5:00 | 8:00 |
| (3) | MORNING | 8:00 | 12:00 |
| (4) | MIDDAY | 12:00 | 14:00 |
| (5) | AFTERNOON | 14:00 | 17:00 |
| (6) | EVENING | 17:00 | 19:00 |
| (7) | NIGHT | 19:00 | 24:00 |

FIG.15

EXAMPLE OF OPERATION PATTERN-DIFFERENTIATED OPERATION MODE TIME SCHEDULE CONFIGURATION

(A)

| IDEN-TIFIER | OPERATION PATTERN \ TIME ZONE | (1) THE EARLY HOURS | (2) EARLY MORNING | (3) MORNING | (4) MIDDAY | (5) AFTER-NOON | (6) EVENING | (7) NIGHT |
|---|---|---|---|---|---|---|---|---|
| EX 1 | DR PRIORITY: AGGREGATOR INSTRUCTION CASE | A | A | A | A | A | A | A |
| EX 2 | NIGHT DISCHARGE MODE USING DAYTIME H-PCS ENERGY STORAGE CONTROL MODE | C | C | B | B | B | C | C |
| EX 3 | H-PCS ENERGY RELEASE CONTROL MODE | C | C | C | C | C | C | C |
| EX 4 | INDEPENDENT CONTROL MODE | D | D | D | D | D | D | D |
| EX 5 | PEAK CUT MODE | — | — | E (C) | E (C) | E (C) | E (C) | — |
| EX 6 | PEAK SHIFT MODE (STORE LOW POWER, DISCHARGE DURING HIGH POWER) | F(B) | — | F(C) | F(C) | F(C) | F(C) | — |
| EX 7 | ORIGINAL CONFIGURATION | OPTIONAL | OPTIONAL | OPTIONAL | OPTIONAL | OPTIONAL | OPTIONAL | OPTIONAL |

REMARK 1) MAIN DR INSTRUCTION IN FIG. 16 IS OPERATION IN CASE WHERE CONSUMER HAS SELECTED EX1
REMARK 2) E(C) IN FIG. 16 SIGNIFIES OPERATION MODE C UNDER CONDITION OF PEAK CUT SYSTEM INPUT UPPER LIMIT
REMARK 3) F(C) IN FIG. 16 SIGNIFIES OPERATION MODE C UNDER CONDITION OF PEAK SHIFT SYSTEM INPUT UPPER LIMIT
REMARK 4) F(B) IN FIG. 16 SIGNIFIES PEAK SHIFT OPERATION MODE B (B)

| OPERATION MODES AND SIGNS | |
|---|---|
| A | DR PRIORITY: AGGREGATOR INSTRUCTION MODE (SELECT CONTROL MODES a TO g) |
| B | H-PCS ENERGY STORAGE CONTROL MODE (SELECT CONTROL MODES a TO d) |
| C | H-PCS ENERGY RELEASE CONTROL MODE (SELECT CONTROL MODES e TO g) |
| D | INDEPENDENT CONTROL MODE (SELECT CONTROL MODES h TO k) |
| E | PEAK CUT MODE (CONFIGURE UPPER LIMIT VALUE, SELECT CONTROL MODES e TO g) |
| F | PEAK SHIFT MODE (SELF-SUFFICIENT DURING HIGH POWER) |

FIG.16

FIRST CONTROL INSTRUCTION AND DATABASE (POWER MANAGEMENT SERVER ↔ AGGREGATION SERVER)

| | POWER COMPANY TASK (DR INSTRUCTION) | CORRESPONDING AGGREGATOR TASK (SECOND CONTROL INSTRUCTION) | POWER COMPANY INSTRUCTION (EXAMPLES) | | PERFORMANCE REPORT (EXAMPLE) FROM AGGREGATOR |
|---|---|---|---|---|---|
| | | | RESPONSE TIME INTERVAL | INDICATED VALUE | |
| I | PEAK SHIFT | CONTROL TO STORE/RELEASE H-PCS ENERGY WITH PEAK SHIFT OBJECTIVE | THE DAY BEFORE | START TIME, CONTROL TIME INTERVAL, CAPACITY (MWh) | START TIME, CONTROL TIME INTERVAL, CAPACITY (MWh) |
| II | PEAK CUT | CONTROL TO RELEASE H-PCS ENERGY WITH PEAK CUT OBJECTIVE | THE DAY BEFORE | START TIME, CONTROL TIME INTERVAL, OUTPUT (MW) | START TIME, CONTROL TIME INTERVAL, OUTPUT (MW) |
| III | DEMAND ADJUSTMENT 1 | H-PCS ENERGY STORAGE CONTROL CORRESPONDING TO REQUEST | A FEW MINUTES | START TIME, CONTROL TIME INTERVAL, CAPACITY (MWh) | START TIME, CONTROL TIME INTERVAL, CAPACITY (MWh) |
| IV | DEMAND ADJUSTMENT 2 | H-PCS ENERGY RELEASE CONTROL CORRESPONDING TO REQUEST | A FEW MINUTES | START TIME, CONTROL TIME INTERVAL, CAPACITY (MWh) | START TIME, CONTROL TIME INTERVAL, CAPACITY (MWh) |
| V | FREQUENCY-POWER CONTROL | H-PCS ENERGY STORAGE/RELEASE CONTROL BY MEANS OF FREQUENCY | IN REAL TIME | START TIME, CONTROL TIME INTERVAL | START TIME, CONTROL TIME INTERVAL, CAPACITY (MWh) |
| VI | REACTIVE POWER CONTROL | CONTROL REACTIVE POWER | IN REAL TIME | START TIME, CONTROL TIME INTERVAL | START TIME, CONTROL TIME INTERVAL, CAPACITY (MWh) |
| VII | PV OUTPUT POWER FLOW REVERSAL PREVENTION | CONTROL PV OUTPUT SUPPRESSION, OUTPUT PROHIBITION | A FEW MINUTES | START TIME, CONTROL TIME INTERVAL, MAXIMUM OUTPUT (MW), CAPACITY (MWh) | START TIME, CONTROL TIME INTERVAL, MAXIMUM OUTPUT (MW), CAPACITY (MWh) |
| | 80A | 80B | 80C | 80D | 80E |

FIG.17

SECOND CONTROL INSTRUCTION (AGGREGATION SERVER ↔ H-PCS)

| | AGGREGATOR TASK (SECOND CONTROL INSTRUCTION) | AGGREGATOR INSTRUCTION (EXAMPLE) | | REPORT FROM H-PCS (EXAMPLE) |
|---|---|---|---|---|
| | | CORRESPONDING CONTROL MODE BY MEANS OF H-PCS | INDICATED VALUE | |
| 1 | H-PCS ENERGY STORAGE | a, b, c, d | START TIME, END TIME, CAPACITY kWh | START TIME, END TIME, CAPACITY kWh |
| 2 | H-PCS ENERGY RELEASE | e, f, g | START TIME, END TIME, CAPACITY kWh | START TIME, END TIME, CAPACITY kWh |
| 3 | FREQUENCY-POWER CONTROL | ENERGY STORAGE a, b, c, d + RELEASE e, f, g | START TIME, END TIME, CAPACITY kWh | START TIME, END TIME, CAPACITY kWh |
| 4 | REACTIVE POWER CONTROL | i | START TIME, END TIME, CAPACITY kVarh | START TIME, END TIME, CAPACITY kVarh |
| 5 | PREVENT REVERSE POWER FLOW OF PV OUTPUT | a, b, c, d | START TIME, END TIME, CAPACITY kWh | START TIME, END TIME, PREVENTION CAPACITY kWh |

AGGREGATION SYSTEM, CONTROL METHOD THEREOF, AND CONTROL APPARATUS

TECHNICAL FIELD

The present invention relates to an aggregation system, a control method thereof, and a control apparatus, and is suitably applied to an aggregation system with which an aggregator controls the input and output of electrical power to a system of each consumer upon receiving a request from a power wholesaler or the like, for example.

BACKGROUND ART

In recent years, due to the diffusion of solar power generation equipment and electric vehicles (hereinafter suitably referred to as EV (Electric Vehicles)) and storage cells and so forth, in addition to the electrical power supplied by power wholesalers, a concept known as VPP (Virtual Power Plant), which effectively utilizes electrical power generated on the power consumer side such as by single-family homes, buildings and commercial facilities, has become widespread.

VPP denotes a concept of integrating a plurality of small-scale private power generation equipment, such as, for example, commercial private power generation equipment and domestic solar power generation equipment, and built-in storage cells of electric vehicles, to exercise control such that the foregoing electrical power sources are like one power plant as it were.

In recent years, VPP wholesalers (hereinafter called aggregators), who establish demand response contracts with a plurality of power consumers (hereinafter simply called consumers) and, in accordance with the demand response needs from power wholesalers and the like, control the charging and discharging of electrical power apparatuses that are capable of storing or generating electric power such as storage cells, electric vehicles, solar power generation equipment, fuel cell power generation equipment and gas power generation equipment which are owned by each consumer, have also appeared.

In the foregoing case, the aggregator suppresses or increases power consumption by acquiring required information such as the capacity and power generation amount of an electrical power apparatus owned by the consumer from each consumer, selecting the required electrical power apparatus needed by the consumer according to the demand response needs from the power wholesaler based on this information, and controlling the operation of the power apparatus.

Note that PTL 1 discloses the fact that attribute information of electric vehicles is collected by an electric vehicle device, the collected attribute information is provided to an aggregation system via an electric vehicle station device, and the available power capacity is predicted based on the attribute information of each electric vehicle.

CITATION LIST

Patent Literature

[PTL 1] Japanese Patent Publication No. 5905836.

SUMMARY OF THE INVENTION

Problems to be Solved by the Invention

Incidentally, in a system (hereinafter called an aggregation system) in which an aggregator controls the charging and discharging of the power apparatuses of each consumer according to demand response needs from a power wholesaler as described hereinabove, there has been a problem in that the aggregator must control the charging and discharging of these power apparatuses for each consumer and each power apparatus the consumer owns and in that a heavy load is exerted on the server apparatus where the aggregator is installed.

The present invention was devised in view of the foregoing points and an object of this invention is to propose an aggregation system, a control method thereof, and a control apparatus which enable the load on the server apparatus where the aggregator is installed to be markedly reduced.

Means to Solve the Problems

In order to solve this problem, the present invention provides, in an aggregation system, a control apparatus which is provided for each consumer and controls charging and discharging of each of one or more power apparatuses which the corresponding consumer owns and power I/O to/from a system, and a server apparatus which sends a demand response-related control instruction to the control apparatus of each of the consumers respectively, wherein the server apparatus calculates, for each of the consumers and as an allocation amount of the consumer, an upper limit value for the power which the consumer inputs from the system or a lower limit value for the power which the consumer is to output to the system, according to a requested task and power provision amount, and sends the respective control instructions designating the calculated allocation amount of each consumer to the control apparatus of the consumer, and wherein the control apparatuses each control the charging and discharging of the corresponding power apparatus so that the power input from the system is equal to or smaller than the allocation amount designated in the control instruction or so that power in the allocation amount is output to the system.

Furthermore, according to the present invention, in an aggregation system control method, which aggregation system comprises a control apparatus which is provided for each consumer and controls charging and discharging of each of one or more power apparatuses which the corresponding consumer owns and power I/O to/from a system respectively, and a server apparatus which sends a demand response-related control instruction to the control apparatus of each of the consumers respectively, the aggregation system control method comprising a first step in which the server apparatus calculates, for each of the consumers and as an allocation amount of the consumer, an upper limit value for the power which the consumer inputs from the system or a lower limit value for the power which the consumer is to output to the system, according to a requested task and power provision amount, and sends the respective control instructions designating the calculated allocation amount of each consumer to the control apparatus of the consumer, and a second step in which the control apparatuses each control the charging and discharging of the corresponding power apparatus so that the power input from the system is equal to or smaller than the allocation amount designated in the control instruction or so that power in the allocation amount is output to the system.

Moreover, according to the present invention, in a control apparatus which controls charging and discharging of subordinate power apparatuses according to a demand response-related control instruction issued from a high order server apparatus, there exist, subordinate to the control apparatus, one or more power apparatuses which the corresponding owner owns, the control apparatus comprising an energy management apparatus which communicates with the server apparatus and which outputs an indication corresponding to the control instruction issued from the server apparatus and a system control apparatus which controls the required power apparatus among the subordinate one or more power apparatuses according to the indication output from the energy management apparatus, wherein the server apparatus calculates, for each of the consumers and as an allocation amount of the consumer, an upper limit value for the power which the consumer inputs from the system or a lower limit value for the power which the consumer is to output to the system, according to a requested task and power provision amount, and sends the respective control instructions designating the calculated allocation amount of each consumer to the control apparatus of the consumer, and wherein the system control apparatus controls the charging and discharging of the corresponding power apparatus so that the power input from the system is equal to or smaller than the allocation amount designated in the control instruction or so that power equal to or larger than the allocation amount is output to the system.

According to the aggregation system, control method thereof, and control apparatus of the present invention, the control apparatus of each consumer is capable of autonomously controlling a subordinate power apparatus based on a control instruction from the server apparatus.

Advantageous Effects of the Invention

According to the present invention, it is possible to realize an aggregation system, control method thereof, and control apparatus which enable the load on the server apparatus where the aggregator is installed to be markedly reduced.

BRIEF DESCRIPTION OF DRAWINGS

FIG. 4 is a table serving to explain futures information.

FIG. 5 is a table serving to explain performance information.

FIG. 6 is a table serving to explain period information.

FIG. 8 is a table serving to explain initial registration information of a consumer.

FIG. 9 is a conceptual drawing showing a possible output value management table.

FIG. 10 is a conceptual drawing showing a possible input value management table.

FIG. 11 is a conceptual drawing showing a performance value table.

FIG. 12 is a table serving to explain units of demand response control in a system control apparatus.

FIG. 13 is a table serving to explain control modes.

FIG. 14 is a table serving to explain a time schedule of one day of operation.

FIG. 15A is a table serving to explain operation patterns.

FIG. 15B is a table serving to explain operation modes.

FIG. 16 is a table serving to explain a first control instruction.

FIG. 17 is a table serving to explain a second control instruction.

DESCRIPTION OF EMBODIMENTS

An embodiment of the present invention will now be explained in detail with reference to the appended drawings.

(1) Configuration of Aggregation System According to this Embodiment

Figure 1:
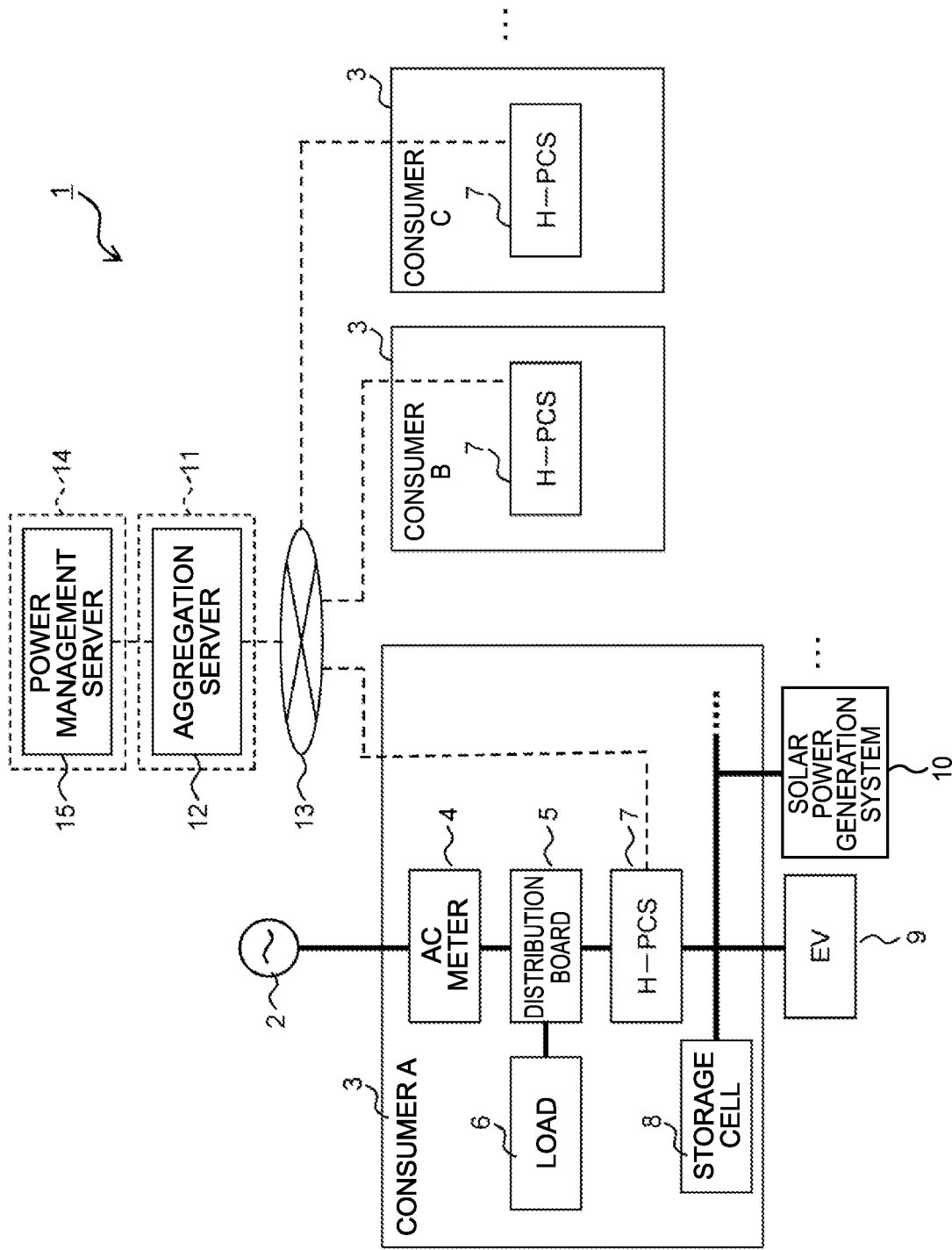
FIG. 1 is a block diagram showing a schematic configuration of the aggregation system according to this embodiment.

In FIG. 1, 1 denotes the overall aggregation system according to this embodiment. In this aggregation system 1, electrical power generated by a power wholesaler 14 is sent to each consumer 3 via a system 2 comprising power lines and distribution lines and the like, and this electrical power is supplied to a load 6 such as an electrical appliance like lighting equipment or an air conditioner of the consumer 3 via an AC meter 4 and a distribution board 5.

A hybrid power conversion apparatus (H-PCS: Hybrid Power Conditioning System) 7 is coupled to each distribution board 5 of each consumer 3. The hybrid power conversion apparatus 7 is a power conversion apparatus which has a function for converting AC power which is input from the system 2 to DC power, inputting same to apparatuses which are capable of storing or generating electrical power (hereinafter called power apparatuses) such as a storage cell 8, an electric vehicle (EV) 9, and solar power generation equipment (PV: Photovoltaics) 10 and the like which the consumer 3 owns, and for converting the power generated or discharged from the power apparatuses from DC power to AC power and outputting same to the system 2.

Furthermore, a hybrid power conversion apparatus 7 comprises a function for controlling the charging and discharging of the power apparatuses that the consumer 3 owns by means of operation modes that are preconfigured by the consumer 3 from among a plurality of operation modes or indicated by an aggregation server 12, described subsequently. Note that, here, configurable operation modes include, for example, as shown in FIG. 15B, 'DR (Demand Response) prioritization' which prioritizes control instructions from the aggregation server 12, 'self-sufficient operation' which stores power in storage cells 8 and built-in storage cells of electric vehicles 9 at night and during the daytime and provides power consumption at night using the stored electrical power, and 'energy release prioritization' which prioritizes the discharge of electrical power generated by solar power generation equipment 10 and the like. Details of this operation mode will be described subsequently.

The hybrid power conversion apparatus 7 of each consumer 3 is coupled via a network 13 to the aggregation server 12 of the aggregator 11 with which each consumer 3 has established a demand response contract, and periodically sends futures information which is described subsequently with reference to FIG. 4, performance information which is described subsequently with reference to FIG. 5, and period information which is described subsequently with reference to FIG. 6 to the aggregation server 12.

Furthermore, a first control instruction which requests execution of tasks such as a peak cut or peak shift, according to a power generation status of the current power wholesaler 14, a future power generation plan, current weather, a future weather forecast and a current power consumption amount and future power consumption prediction amount, is supplied to the aggregation server 12 at regular intervals (every 30 minutes, for example) or at irregular intervals from a power management server 15 that has been installed by the power wholesaler 14. The first control instruction includes a period for executing the task (a start time and a control time interval or end time), and a power amount (provision amount) for (suppressing or increasing) provision within the overall area managed by the aggregation server 12 by executing this task.

Thus, the aggregation server 12 calculates each allocation amount (the upper limit value for the power that is input from the system 2 by the consumer 3 and the lower limit value for the power that is output to the system 2 by each consumer 3) for each consumer 3 for provisioning electrical power in the provision amount requested by the first control instruction based on the first control instruction supplied from the power management server 15 and the aforementioned futures information, performance information and period information which are sent from the hybrid power conversion apparatus 7 of each consumer 3.

Moreover, the aggregation server 12 designates the allocation amounts thus calculated as indicated values, generates, for each consumer 3, a second control instruction which designates an operation mode or control mode of the hybrid power conversion apparatus 7 enabling the consumer 3 to input and output power in the allocation amount to/from the system 2, and sends the generated second control instruction to the hybrid power conversion apparatus 7 of each consumer 3 via the network 13. Note that a control mode is an operating mode of the hybrid power conversion apparatus 7 which prescribes the power charging source and discharging destination. Details of control modes will be described subsequently.

Furthermore, the hybrid power conversion apparatus 7 which has received the second control instruction controls the charging and discharging of subordinate power apparatuses in the operation mode or control mode designated in the second control instruction so that the power amount of the power that is input and output to/from the system 2 is the indicated value designated in the second control instruction.

Accordingly, in the aggregation system 1 according to this embodiment, the hybrid power conversion apparatus 7 of each consumer 3 autonomously controls the charging and discharging of subordinate power apparatuses by means of the operation mode or control mode designated by the second control instruction so that the power amount of the power input and output to/from the system 2 is the indicated value designated in the second control instruction, and therefore the aggregation server 12 does not need to perform charging and discharging control for each power apparatus of each consumer 3 and the load on the aggregation server 12 can accordingly be reduced.

(2) Configuration of the Hybrid Power Conversion Apparatus

Figure 2:
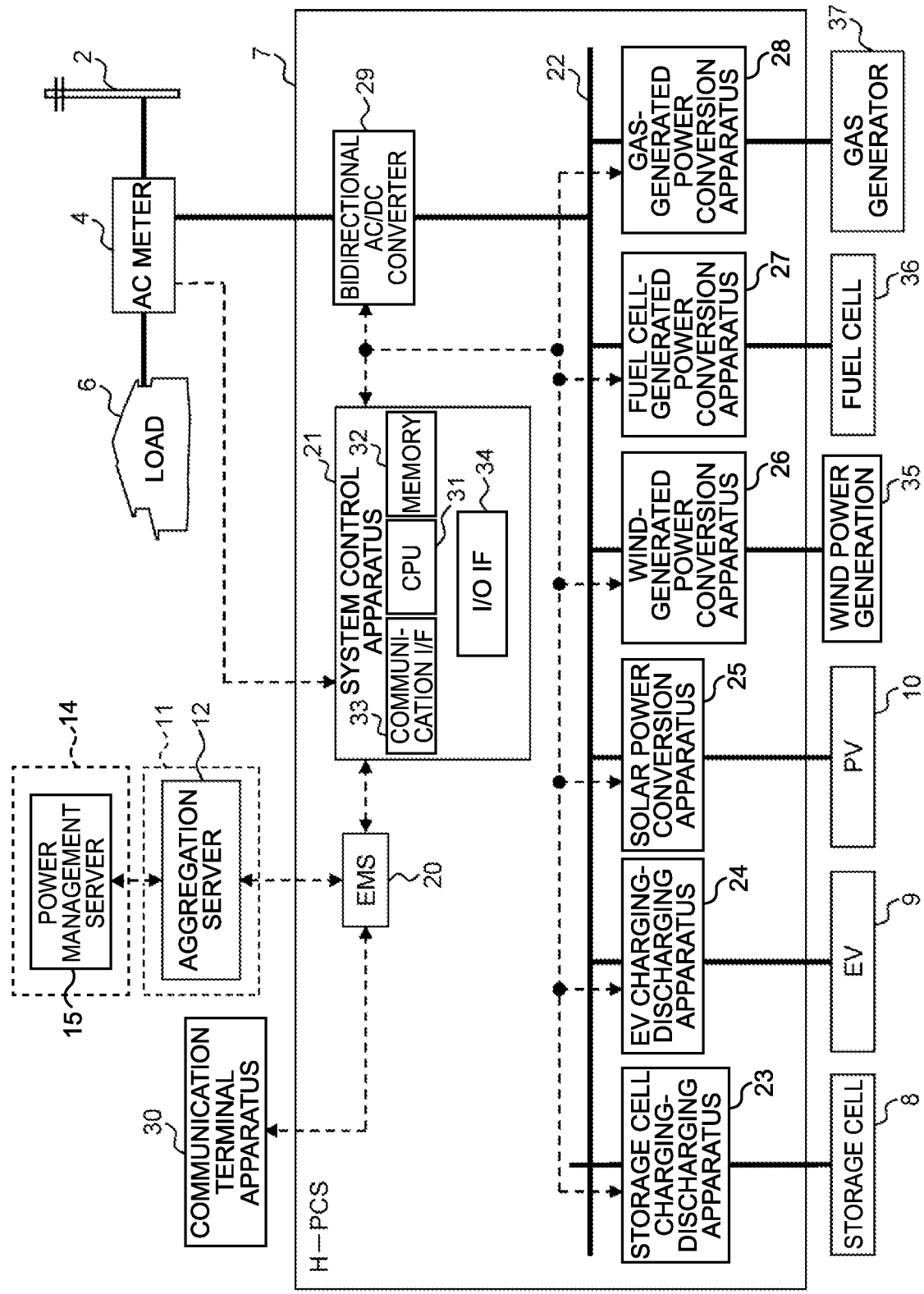
FIG. 2 is a block diagram showing a configuration of a hybrid power conversion apparatus according to this embodiment.

FIG. 2 shows a configuration of the hybrid power conversion apparatus (H-PCS) 7 according to this embodiment. As shown in FIG. 2, this hybrid power conversion apparatus 7 is configured by comprising an energy management apparatus (hereinafter called an EMS (Energy Management System) 20 and a system control apparatus 21, and a plurality of charging-discharging apparatuses (the storage cell charging-discharging apparatus 23 and EV charging-discharging apparatus 24 in FIG. 2) and a plurality of power conversion apparatuses (the solar power conversion apparatus 25, wind-generated power conversion apparatus 26, fuel cell-generated power conversion apparatus 27, and gas-generated power conversion apparatus 28 in FIG. 2) and a bidirectional AC/DC (Alternating Current/Direct Current) converter 29, which are coupled to one another via a DC (Direct Current) bus 22, and the like.

The EMS 20 is a microcomputer apparatus which comprises information processing resources such as a CPU (Central Processing Unit) and memory. Built into this EMS 20 are a communication function for performing communications with a communication terminal apparatus 30 such as a smart phone, tablet or personal computer or the like and with the aggregation server 12, and a control function for charging and discharging and so forth which controls the required charging and discharging of power apparatuses and the like by providing, via the communication terminal apparatus 30, a corresponding indication to the system control apparatus 21 according to the operation mode configured by the consumer 3 (FIG. 1) and the second control instruction supplied from the aggregation server 12.

Moreover, also built into the EMS 20 are a power consumption optimization function for controlling the charging and discharging of each power apparatus via the system control apparatus 21 to optimize the power consumption state of the consumer 3 based on the voltage and frequency of the power from the system 2 acquired from the AC meter 4 and on a used power amount, and an independent operation control function which, when a power outage of the system 2 has occurred, performs control to provide power consumption independently by using the power stored in a power apparatus which the consumer 3 owns or the power generated by same power apparatus, and the like.

The system control apparatus 21 is a microcomputer apparatus which controls operations with the bidirectional AC/DC converter 29, each charging-discharging control apparatus (the storage cell charging-discharging apparatus 23 and EV charging-discharging apparatus 24) and each power conversion apparatus (the solar power conversion apparatus 25, wind-generated power conversion apparatus 26, fuel cell-generated power conversion apparatus 27, and gas-generated power conversion apparatus 28) based on indications from the EMS 20, and which is configured by comprising the CPU 31, memory 32, communication interface 33, and I/O interface 34.

The CPU 31 is a processor which is tasked with controlling the overall operation of the system control apparatus 21. Furthermore, the memory 32 is configured from a volatile or nonvolatile semiconductor memory and is used to store and retain various programs and information and the like. Various processing of the whole system control apparatus 21, as described subsequently, is executed by the CPU 31 executing programs which are stored in the memory 32. The communication interface 33 is an interface which performs protocol control during communications with the EMS 20, and the I/O interface 34 is an interface which performs communication with the bidirectional AC/DC converter 29 and with each charging-discharging apparatus and each power conversion apparatus and protocol control and I/O control during input/output.

Each charging-discharging apparatus is a control apparatus comprising a function for controlling charging and discharging of a power apparatus with a storage function (the storage cell 8 or electric vehicle 9 in FIG. 2) within a range of 0 to 100% of the capacity thereof, for example, according to an indication from the system control apparatus 21. Also built into the charging-discharging apparatus is a function for measuring a charging-discharging voltage value and a charging-discharging current value of a power apparatus which is taken as the target and issuing notification of the foregoing values to the system control apparatus 21, and for issuing notification of various information of the power apparatus (a storage amount and the presence or absence of errors and so forth) to the system control apparatus 21.

Likewise, the power conversion apparatus is a control apparatus which comprises a function for discharging the power which is generated by the target power apparatuses with the power generation function (the solar power generation equipment 10, a wind power generation system 35, a fuel-cell power generation system 36 or a gas generator apparatus 37 in FIG. 2) in a range of 0 to 100% according to an indication from the system control apparatus 21 to the DC bus 22. Moreover, also built into the power conversion apparatus is a function for measuring a voltage value and current value for the power generated by the target power apparatus and issuing notification of the foregoing values to the system control apparatus 21.

The bidirectional AC/DC converter 29 is a converter which comprises a function for converting the AC power supplied from the system 2 to DC power and outputting same to the DC bus 22, and for converting the DC power discharged to the DC bus 22 from each charging-discharging apparatus and each power conversion apparatus to AC power and outputting the DC power to the system 2. Also built into the bidirectional AC/DC converter 29 is a function for controlling the power amount which is output to the system 2 from the DC bus 22 or input from the system 2 to the DC bus 22 in a range of 0 to 100 of the power flowing through the DC bus 22 or system 2 and a function for measuring a DC voltage value, DC current value and AC voltage value and an AC current value and AC frequency of the power that is input and output to/from the DC bus 22 and for issuing notification of the foregoing measured values and frequency to the system control apparatus 21.

Figure 3:
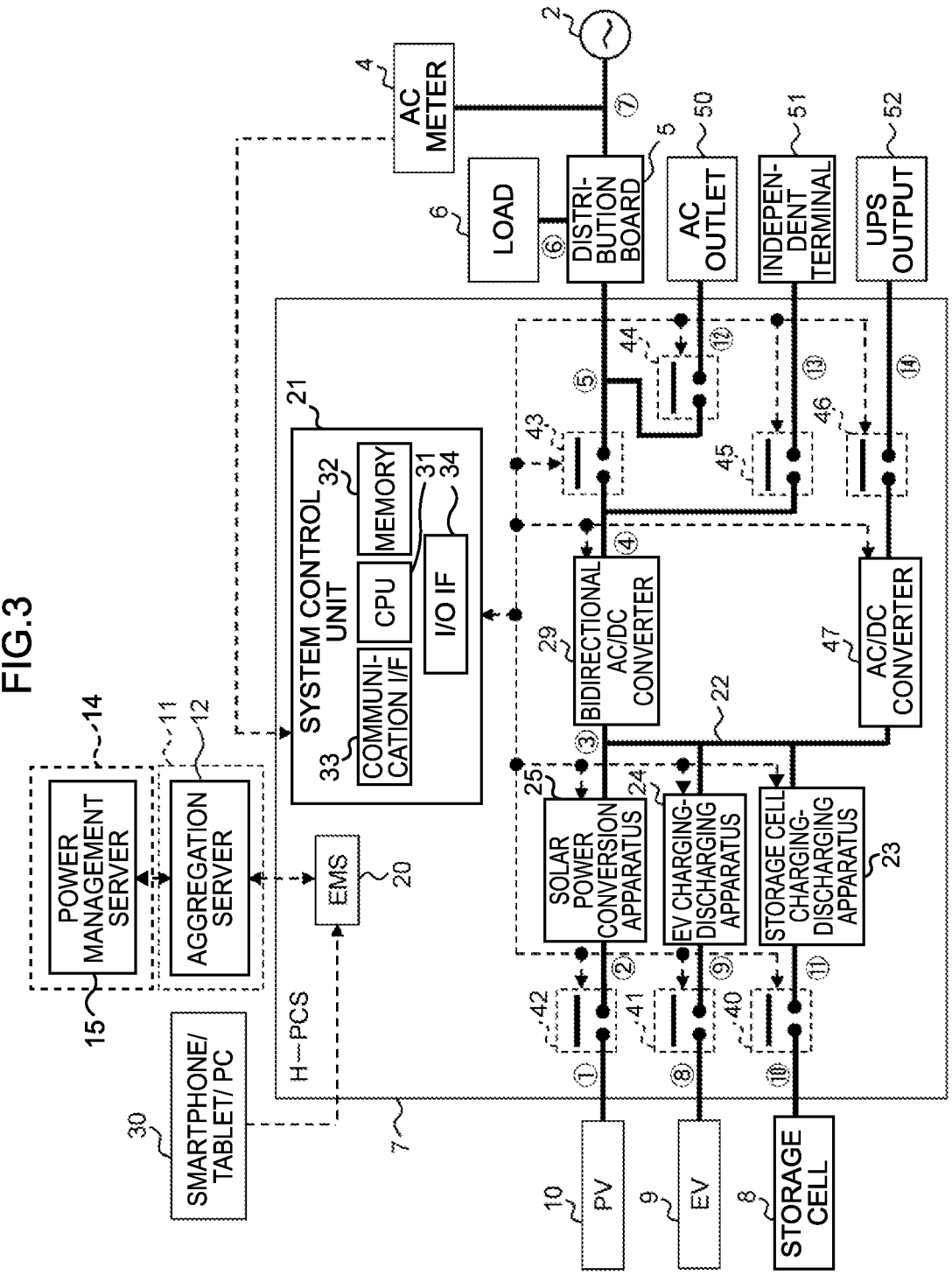
FIG. 3 is a block diagram showing a configuration of a hybrid power conversion apparatus serving to explain this embodiment.

Note that, in the ensuing explanation, in order to facilitate the explanation, it is assumed that each consumer 3 owns a storage cell 8, electric vehicle 9 and solar power generation equipment 10 as power apparatuses and that the hybrid power conversion apparatus 7 comprises the storage cell charging-discharging apparatus 23 and EV charging-discharging apparatus 24 as charging-discharging apparatuses, and the solar power conversion apparatus 25 as a power conversion apparatus, as shown in FIG. 3. In the foregoing case, safety measure switches 40 to 43 are provided between the storage cell 8 and storage cell charging-discharging apparatus 23, the electric vehicle 9 and EV charging-discharging apparatus 24, the solar power generation equipment 10 and solar power conversion apparatus 25, and the bidirectional AC/DC converter 29 and distribution board 5, respectively.

Furthermore, the ensuing explanation is provided based on the assumption that the hybrid power conversion apparatus 7 comprises an AC outlet 50, an independent terminal 51 and a UPS (Uninterruptible Power Supply) terminal 52. In the foregoing case, the AC outlet 50 is coupled between the distribution board 5 and switch 43 via the switch 44 and the independent terminal 51 is coupled between the bidirectional AC/DC converter 29 and switch 43 via the switch 45. Furthermore, the UPS terminal 52 is coupled to the DC bus 22 via a DC/AC converter 47.

In the hybrid power conversion apparatus 7 according to this embodiment which has this configuration, the EMS 20 sends futures information, performance information and period information to the aggregation server 12.

As shown in FIG. 4, the futures information is information which includes one week's worth of operation patterns starting from the current day of the hybrid power conversion apparatus 7 which the consumer 3 has configured in the hybrid power conversion apparatus 7 and which information is sent from the hybrid power conversion apparatus 7 to the aggregation server 12 once per day, for example. In the example of FIG. 4, it can be seen that the operation patterns of the hybrid power conversion apparatus 7 for the current day, next day, second day, third day, fourth day, fifth day and sixth day have been configured as operation patterns 'EX2,' 'EX3,' 'EX6,' 'EX6,' 'EX6,' 'EX6' and 'EX3' respectively. Details of these operation patterns will be described subsequently.

The performance information is information relating to the power generation amount, charged-discharged power amount and power consumption amount and so forth on the previous day of the consumer 3 and is sent from the hybrid power conversion apparatus 7 to the aggregation server 12 once per day, for example.

As shown in FIG. 5, for example, the performance information includes information such as the power generation amount of the solar power generation equipment 10 ('power generation amount' of 'PV') from 0:00 to 24:00 on the previous day, the charged power amount (the 'charged power amount' of the 'storage cell' and 'EV') and the discharged power amount (the 'discharged power amount' of the 'storage cell' and 'EV') from 0:00 to 24:00 on the previous day of the storage cell 8 and the built-in storage cell of the electric vehicle 9, the currently stored power amount at 0:00 on the previous day (the '0:00 current power amount' of the 'storage cell' and 'EV') and the currently stored power amount at 24:00 on the previous day (the '24:00 current power amount' of the 'storage cell' and 'EV'), the power amount which is input from the system 2 (the 'system input power amount' of the 'system') and the power amount which is output to the system 2 (the 'system discharge power amount' of the 'system'), the power adjustment amount through voltage control (the 'voltage controlled power adjustment amount' of the 'system'), the power adjustment amount through frequency control (the 'frequency controlled power adjustment amount' of the 'system') and the reactive power adjustment amount (the 'reactive power adjustment amount' of the 'system') from 0:00 to 24:00 on the previous day, and the used power amount used by the load 6 (the 'used power amount' of the 'load') from 0:00 to 24:00 on the previous day.

Moreover, the performance information also includes information such as an initial value of the operation mode ('initial operation mode' of 'history') from 0:00 to 24:00 on the previous day, a post-change operation mode ('post-update operation mode' of 'history') and the time the change was performed ('change time' of 'history') when the operation mode changed from 0:00 to 24:00 on the previous day, and each of the power amounts which have been input and output to/from the system 2 ('discharged power amount' and 'charged power amount' of 'history') from 0:00 to 24:00 on the previous day according to the second control instruction supplied from the aggregation server 12.

The period information is information relating to the power generation amount, charged-discharged power amount, and power consumption amount during the preceding 30 minutes, for example, and is sent from the hybrid power conversion apparatus 7 to the aggregation server 12 every 30 minutes.

As shown in FIG. 6, for example, the period information includes information such as the power generation amount of the solar power generation equipment 10 ('power generation amount' of 'PV') during the preceding 30 minutes, the charged power amount ('charged power amount' of the 'storage cell' and 'EV') and the discharged power amount ('discharged power amount' of the 'storage cell' and 'EV') during the preceding 30 minutes of the storage cell 8 and the built-in storage cell of the electric vehicle 9, the stored power amount of the storage cell 8 and the built-in storage cell of the electric vehicle 9 when the period information was previously sent (the 'previous power amount' of the 'storage cell' and 'EV') and the currently stored power amount (the 'current power amount' of the 'storage cell' and 'EV'), and the SOC (State of Charge) which indicates the charging rate of the storage cell 8 and built-in storage cell of the electric vehicle 9 when the period information was previously sent (the 'previous SOC' of the 'storage cell' and 'EV') and the current charging rate of the built-in storage cell of the electric vehicle 9 ('current SOC' of the 'storage cell' and 'EV'), and includes information on whether the electric vehicle 9 is coupled to the EV charging-discharging apparatus 24 (FIG. 3) ('EV coupling' of 'EV').

Moreover, the period information also includes information such as the power amount which is input from the system 2 (the 'system input power amount' of the 'system') and the power amount which is output to the system 2 (the 'system discharge power amount' of the 'system'), the power adjustment amount through voltage control (the 'voltage controlled power adjustment amount' of the 'system'), the power adjustment amount through frequency control (the 'frequency controlled power adjustment amount' of the 'system') and the reactive power adjustment amount (the 'reactive power adjustment amount' of the 'system') during the preceding 30 minutes, and the power voltage in the system 2 (the 'system voltage' of the 'system') and the frequency ('system frequency' of the 'system') which have been measured by the AC meter 4 (FIG. 3), and the used power amount of the consumer 3 (the 'used power amount' of the 'system').

Moreover, the period information also includes information such as a maximum possible storage capacity for when the previous period information was sent (the 'previous maximum capacity' in the 'history'), the average possible storage capacity at this time (the 'previous capacity' in the 'history'), the maximum possible storage capacity (the 'current maximum capacity' in the 'history') and the current possible storage capacity (the 'current capacity' in the 'history') in the preceding 30 minutes or one hour, for example, the operation mode that was configured when the period information was previously sent (the 'previous operation mode' in the 'history') and the current operation mode (the 'current operation mode' in the 'history'), information indicating whether an operation has been performed ('DR work/standby' in the 'history') based on the second control instruction from the aggregation server 12 in the preceding 30 minutes, the time when the change was performed when a change in operation mode was performed in the preceding 30 minutes (the 'change time' in the 'history'), the time the foregoing power amount and so forth were measured (the 'measurement time' in the 'history'), the power amount per unit of time that was input and output to/from the system 2 from 0:00 to 24:00 on the previous day (the 'control instruction discharged amount' and 'control instruction charged amount' in the 'history') according to the second control instruction supplied from the aggregation server 12, and the power amount that can be discharged currently (the 'possible charge amount' in the 'history') and the power amount that can be charged currently ('possible charge amount').

Note that, in addition to the foregoing information, the period information also includes information such as a prediction value which is obtained by predicting the discharged power amount in discharging the storage cell 8 and the built-in storage cell of the electric vehicle 9 (including a suppressible input power amount from the system 2) for several hours in 30-minute units (a 'prediction value for system power suppression through discharging of the storage cells (including the EV storage cell)' of the 'system') and a prediction value which is obtained by predicting the amount of increase in the charged power (input power from the system 2) which is realized by charging the storage cell 8 and the built-in storage cell of the electric vehicle 9 for several hours in 30-minute units (a 'prediction value for a system power increase through charging of the storage cells (including the EV storage cell) of the 'system'). These prediction values are calculated by the EMS 20 (FIG. 3) based on past performance and so forth.

(3) Aggregation Server Configuration

Figure 7:
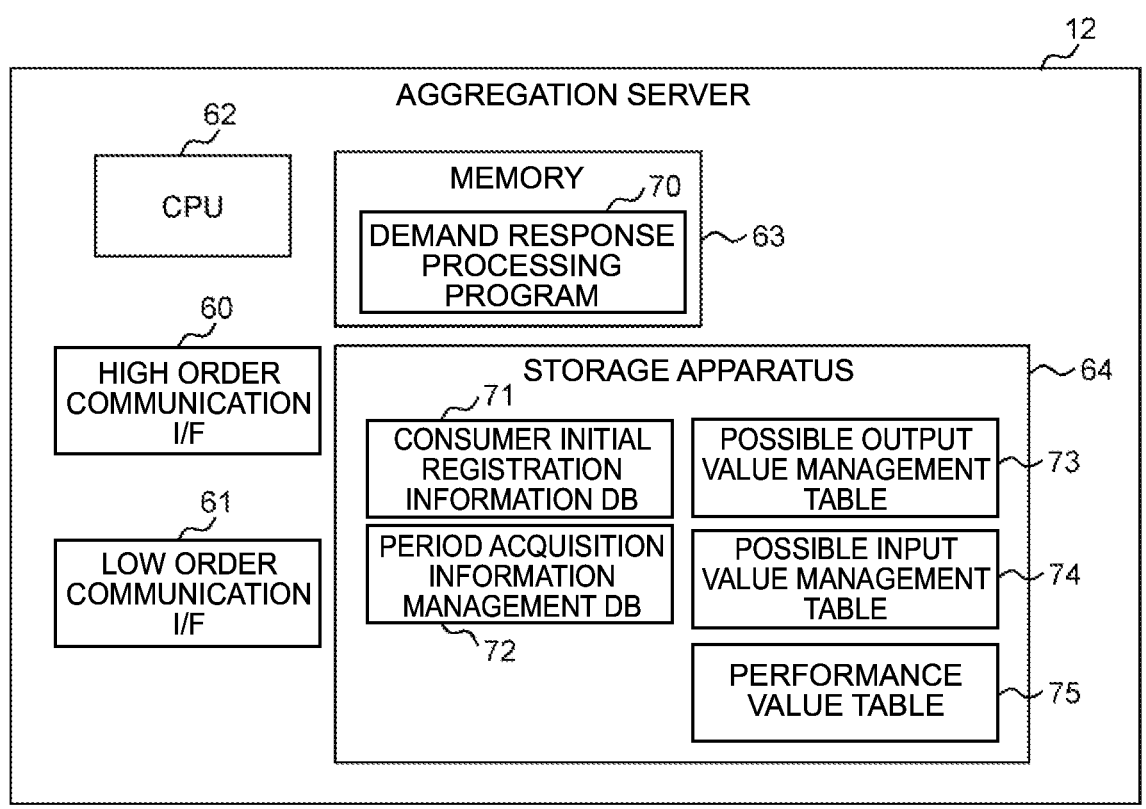
FIG. 7 is a block diagram showing a configuration of an aggregation server.

FIG. 7 is a schematic configuration of the aggregation server 12. As shown in FIG. 7, the aggregation server 12 is configured by comprising a high order communication interface 60, a low order communication interface 61, a CPU (Central Processing Unit) 62, a memory 63, and a storage apparatus 64.

The high order communication interface 60 is an interface which performs protocol control during communications with the power management server 15 (FIG. 1) of the power wholesaler 14 (FIG. 1). Furthermore, the low order communication interface 61 is an interface which performs protocol control during communications with the hybrid power conversion apparatus 7 of each consumer 3 via the network 13 (FIG. 1) and is configured from an NIC (Network Interface Card) or the like, for example.

The CPU 62 is a processor which is tasked with controlling the overall operation of the aggregation server 12. Furthermore, the memory 63 is configured from a semiconductor memory, for example, and, in addition to being used to temporarily retain various programs, is also used as a working memory of the CPU 62. A demand response processing program 70, which executes various processing relating to the foregoing and subsequently described demand response, is also stored and retained in the memory 63.

The storage apparatus 64 is, for example, configured from a high-capacity, nonvolatile storage apparatus such as a hard disk apparatus or SSD (Solid State Drive) and is used to retain various programs and data and the like for long periods. In the case of this embodiment, the storage apparatus 64 also stores a consumer initial registration information database 71, a period acquisition information management database 72, a possible output value management table 73, a possible input value management table 74, and a performance value table 75.

The consumer initial registration information database 71 is a table which is used to manage information that is initially registered for each of the consumers 3 who have established a demand response contract with the aggregator 11 (FIG. 1). In the case of this embodiment, there exist four items, namely, 'contract party,' 'contracted power,' 'unit,' and 'DR configuration' as information that is to be initially registered for the consumers 3, as shown in FIG. 8.

The 'contract party' is information which relates to a consumer 3 (contract party) who has established a demand response contract with the aggregator 11 and which includes information such as the 'registration date' when the initial information relating to the consumer 3 was registered in the consumer initial registration information database 71, and the 'personal ID,' 'name,' 'postal code, and 'city' of the 'consumer 3'.

Moreover, the 'contracted power' is information which relates to the content of the contract which the consumer 3 has with the power company and which includes information such as the company name of the power company ('power company name'), the 'plan name' and 'capacity' of the contract which the consumer 3 has established with the power company, and the date when the contract was made ('contract date').

The 'unit' is information relating to the hybrid power conversion apparatus 7 which is installed at the consumer 3 and each power apparatus which the consumer 3 owns. When the consumer 3 owns the storage cell 8, electric vehicle 9, and solar power generation equipment 10 as per FIG. 3 as power apparatuses, the information relating to the 'unit' includes information such as the 'type' and 'installation month/year' of the hybrid power conversion apparatus 7, information indicating either single-phase usage or three-phase usage (a single phase or three phases), 'rated output,' AC input voltage and frequency ('AC input (voltage),' 'AC input (frequency),' type of storage cell 8 ('storage cell type'), maximum power ('storage cell maximum power') and capacity ('storage cell capacity'), type of electric vehicle 9 ('EV type'), maximum power of built-in storage cell of electric vehicle ('EV storage cell maximum power') and capacity ('EV storage cell content'), type of solar power generation equipment 10 ('PV type') and maximum power generation amount ('PV maximum power').

Furthermore, 'DR configuration' is information relating to the demand response contract which the consumer 3 has established with the aggregator 11. When the consumer 3 owns the storage cell 8, electric vehicle 9 and solar power generation equipment 10 as per FIG. 3 as power apparatuses, the information relating to the 'DR configuration' includes information such as the charging and discharging values of the built-in storage cell of the electric vehicle 9 ('EV charged power value'), the maximum usage value of the power obtained from the system 2 (the 'system usage power maximum value'), a lower limit value and upper limit value for the SOC of the built-in storage cell of the electric vehicle 9 (the 'EV storage cell SOC lower limit value' and 'EV storage cell SOC upper limit value'), a value of the power with which the storage cell 8 can be charged (the 'storage cell charged power value'), the lower limit value and upper limit value of the SOC of the storage cell 8 (the 'storage cell SOC lower limit value' and 'storage cell SOC upper limit value'), the charging-discharging priority rankings of the built-in storage cell of the electric vehicle 9 and the storage cell 8 ('EV storage cell and storage cell charging-discharging priority rankings').

The period acquisition information management database 72 is a database which is used to perform combined management of the futures information described hereinabove with reference to FIG. 4, the performance information described hereinabove with reference to FIG. 5, and the period information described hereinabove with reference to FIG. 6 which are each sent at regular intervals from the EMS 20 of the hybrid power conversion apparatus 7 of each consumer 3. The period acquisition information management database 72 is updated each time the futures information, performance information or period information is sent from the EMS 20 of the hybrid power conversion apparatus 7 of each consumer 3.

Figure 18:
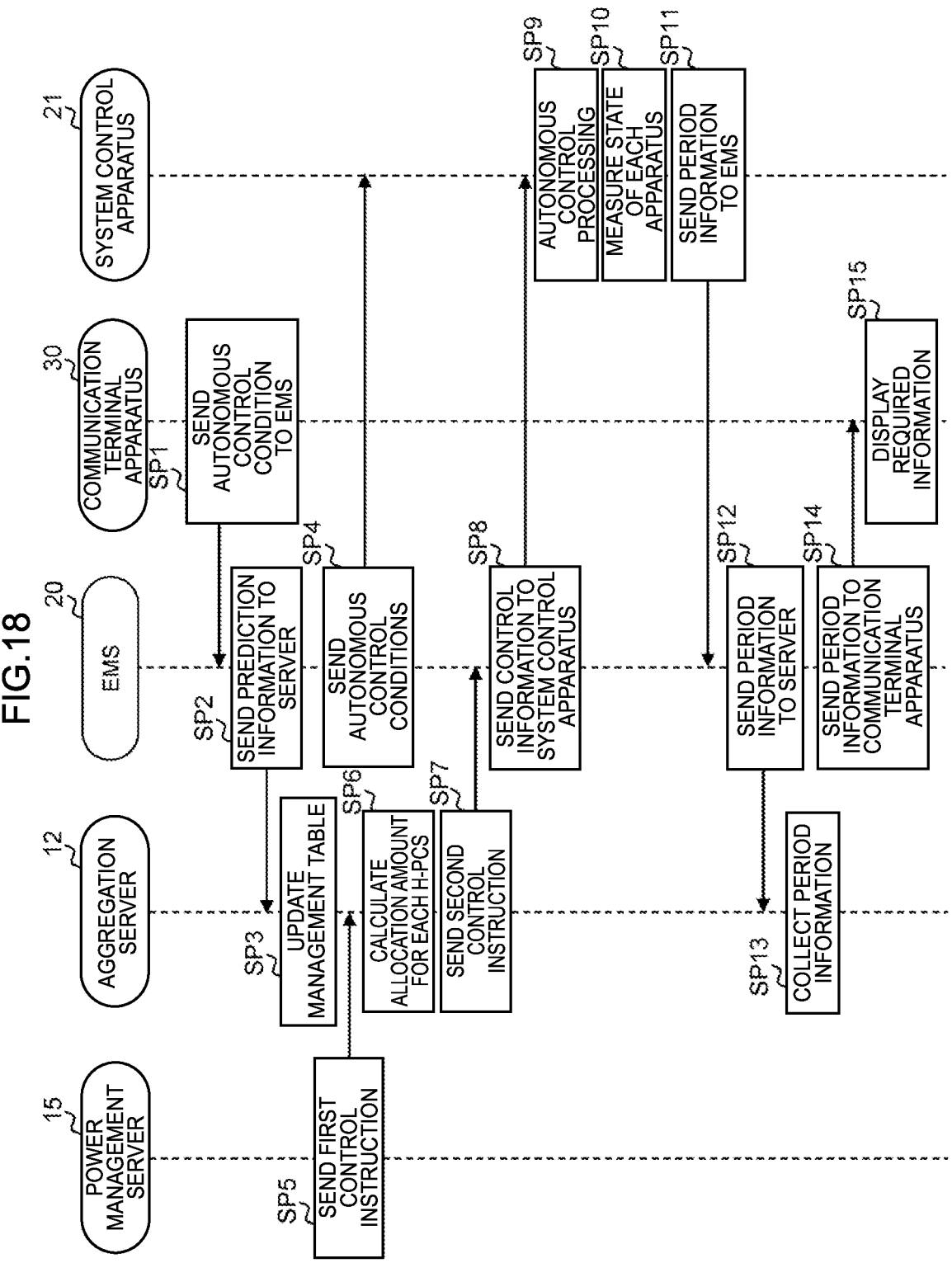
FIG. 18 is a flowchart serving to explain the flow of autonomous control by a hybrid power conversion apparatus.

The possible output value management table 73 is a table which is used to manage the amount of power each consumer 3 can output to the system 2 at the time and to calculate the aforementioned allocation amount which is allocated to each consumer 3 upon executing a task based on the first control instruction, and which table is sequentially updated based on period information (FIG. 6) which is sent every 30 minutes from the hybrid power conversion apparatus 7 of each consumer 3 and prediction information, described subsequently with reference to FIG. 18, which is suitably sent from the hybrid power conversion apparatus 7 of each consumer 3. As shown in FIG. 9, the possible output value management table 73 is configured by comprising an ID field 73A, a current output field 73B, a dischargeable capacity field 73C, and a suppressible power amount prediction value field 73D.

Furthermore, the ID field 73A stores identifiers (ID) which have been assigned to each of the hybrid power conversion apparatuses 7 of each of the consumers 3 who have established a demand response contract with the aggregator 11 (FIG. 1). Furthermore, the current output field 73B stores the output power amount when a corresponding consumer 3 is currently outputting power to the system 2, and the dischargeable capacity field 73C stores the power capacity which the corresponding consumer 3 is capable of generating immediately by discharging the storage cell 8 and the built-in storage cell of the electric vehicle 9.

Furthermore, the suppressible power amount prediction value field 73D is subdivided into a plurality of time interval-differentiated prediction value fields 73E for each 30 minutes, and the prediction value fields 73E each store a prediction value for the discharged power amount (including the suppressible input power amount from the system 2) as a result of the corresponding consumer 3 discharging the power stored in the storage cell 8 and the built-in storage cell of the electric vehicle 9 to the DC bus 22 after a corresponding time interval has elapsed since the current time.

Furthermore, the possible input value management table 74 is a table which is used to manage the amount of power each consumer 3 can input from the system 2 and to calculate the allocation amount which is allocated to each consumer 3 upon executing a task based on the first control instruction, and which table is sequentially updated based on period information (FIG. 6) which is sent every 30 minutes from the hybrid power conversion apparatus 7 of each consumer 3 and prediction information, described subsequently with reference to FIG. 18, which is suitably sent from the hybrid power conversion apparatus 7 of each consumer 3. As shown in FIG. 10, the possible input value management table 74 is configured by comprising an ID field 74A, a current input field 74B, a chargeable capacity field 74C, and a usable output amount prediction value field 74D.

Furthermore, the ID field 74A stores identifiers (ID) which have been assigned to each of the hybrid power conversion apparatuses 7 of each of the consumers 3 who have established a demand response contract with the aggregator 11. Furthermore, the current input field 74B stores an input power value when a corresponding consumer 3 is currently inputting power from the system 2, and the chargeable capacity field 74C stores the power capacity which the corresponding consumer 3 is currently capable of charging immediately to the storage cell 8 and the built-in storage cell of the electric vehicle 9.

Furthermore, the usable output amount prediction value field 74D is subdivided into a plurality of time interval-differentiated prediction value fields 74E for each 30 minutes, and the prediction value fields 74E each store a prediction value for the charged power that can be increased (input power from the system 2) as a result of the corresponding consumer 3 charging the storage cell 8 and the built-in storage cell of the electric vehicle 9 from the DC bus 22 after a corresponding time interval has elapsed since the current time.

The performance value table 75 (FIG. 11) is a table which is used to manage the discharged power as a result of each consumer 3 discharging power to the system 2 from the storage cell 8 and built-in storage cell of the electric vehicle 9 according to the second control instruction from the aggregation server 12, or the charged amount resulting from charging the power input from the system 2 to the storage cell 8 and storage cell of the electric vehicle 9, and which table is created by extracting a portion of the period information (FIG. 6) which is sent every 30 minutes from the hybrid power conversion apparatus 7 of each consumer 3. The performance value table 75 is configured by comprising an ID field 75A, a date field 75B, a start time field 75C, an end time field 75D, a discharging adjustment amount field 75E, and a charging adjustment field 75F.

Furthermore, the ID field 75A stores identifiers (ID) which have been assigned to each of the hybrid power conversion apparatuses 7 of each of the consumers 3 who have established a demand response contract with the aggregator 11. Further, the date field 75B stores dates when the corresponding hybrid power conversion apparatus 7 last performed a demand response to discharge power to the system 2 from the storage cell 8 and built-in storage cell of the electric vehicle 9 or to charge the power input from the system 2 to the storage cell 8 and built-in storage cell of the electric vehicle 9 according to the second control instruction from the aggregation server 12.

Further, the start time field 75C stores the time when the demand response was started (the start time), and the end time field 75D stores the time when the demand response was ended (the end time). Further, the discharging adjustment amount field 75E stores sum totals of the discharged power amounts (output power amounts to the system 2) that have been discharged to the DC bus 22 from the storage cell 8 and the built-in storage cell of the electric vehicle 9 as a result of this demand response and the charging adjustment amount field 75F stores a sum total of amounts of increase in the charged power amount (input power amounts from the system 2) which has been increased by charging the storage cell 8 and built-in storage cell of the electric vehicle 9 from the DC bus 22 as a result of this demand response.

(4) Operation Modes

The operation modes will be described next. FIG. 12 was obtained by arranging the basic demand response-related control units of the system control apparatus 21 in the hybrid power conversion apparatus 7 with the configuration described hereinabove with reference to FIG. 3. As shown in FIG. 12, there exist four basic control content items of the system control apparatus 21, namely, 'Input,' 'charging,' 'output,' and 'discharging.'

In this case, there exist two 'inputs,' namely, 'system' in which power is input from the system 2 to the DC bus 22, and 'PV' in which power that has been generated by the solar power generation equipment 10 is input to the DC bus 22. Furthermore, the system control apparatus 21 realizes 'system' by causing the bidirectional AC/DC converter 29 to operate so that power is input from the system 2 to the DC bus 22 along paths to which the circled numbers '7,' '5,' '4,' and '3' have been assigned in FIG. 3 and in that order and realizes 'PV' by causing the solar power conversion apparatus 25 (FIG. 3) to operate so that power is input from the solar power generation equipment 10 to the DC bus 22 along paths to which the circled numbers '1,' '2,' and '3' have been assigned in FIG. 3 and in that order.

Moreover, there exist two 'charging' types, namely, 'EV charging' in which the built-in storage cell of the electric vehicle 9 is charged and 'storage cell charging' in which the storage cell 8 is charged. Furthermore, the system control apparatus 21 realizes 'EV charging' by causing the EV charging-discharging apparatus 24 to operate so that power is supplied to the built-in storage cell of the electric vehicle 9 along paths to which the circled numbers '3,' '9,' and '8' have been assigned in FIG. 3 and in that order and realizes 'storage cell charging' by causing the storage cell charging-discharging apparatus 23 to operate so that power is supplied to the storage cell 8 along paths to which the circled numbers '3,' '11,' and '10' have been assigned in FIG. 3 and in that order.

There exist four 'outputs', namely, 'system in which power is output to the system 2,' and 'AC outlet,' 'independent terminal,' and 'UPS output' in which power is output via the AC outlet 50, independent terminal 51 or UPS terminal 52 respectively. Furthermore, the system control apparatus 21 realizes this 'system' by causing the bidirectional AC/DC converter 29 to operate so that power can be output to the system 2 along paths to which the circled numbers '3,' '4,' '5,' and '7' have been assigned in FIG. 3 and in that order.

Furthermore, the system control apparatus 21 realizes 'AC outlet' by turning ON the switch 44 so that power can be output to the AC outlet 50 along paths to which the circled numbers '7,' '5,' and '12' have been assigned in FIG. 3 and in that order and realizes 'independent terminal' by turning ON the switch 45 so that power can be output to the independent terminal 51 along paths to which the circled numbers '3,' '4,' and '13' have been assigned in FIG. 3 and in that order. Note that 'independent terminal' is control that is performed only during a power outage. Moreover, 'UPS output' is realized by turning ON the switch 46 so that power can be output to the UPS terminal 52 along paths to which the circled numbers '3' and '14' have been assigned in FIG. 3 and in that order.

Moreover, there exist two types of 'discharging,' namely, 'EV discharging' in which the built-in storage cell of the electric vehicle 9 is discharged and 'storage cell discharging' in which the storage cell 8 is discharged. Furthermore, the system control apparatus 21 realizes 'EV discharging' by causing the EV charging-discharging apparatus 24 to operate so that the power which has been stored in the built-in storage cell of the electric vehicle 9 is output to the DC bus 22 along paths to which the circled numbers '8,' '9,' and '3' have been assigned in FIG. 3 and in that order and realizes 'storage cell discharging' by causing the storage cell charging-discharging apparatus 23 to operate so that the power which has been stored in the storage cell 8 is output to the DC bus 22 along paths to which the circled numbers '10,' '11,' and '3' have been assigned in FIG. 3 and in that order.

Meanwhile, FIG. 13 shows types of control modes which can be executed by the hybrid power conversion apparatus 7 by combining the foregoing control units (operation modes for which the power discharge source and power charging destination have been prescribed) and combinations of control units for realizing the control modes. There exist four control modes, namely, 'charging,' 'discharging,' 'independent,' and 'reactive power.' In FIG. 13,→in the control function field indicates a flow of power from the power apparatus or system 2 on the right side toward the power apparatus or system 2 on the left side, and the 'control unit combination' field indicates the method of combining the control units described hereinabove with reference to FIG. 12 for realizing the corresponding control modes.

For example, 'PV+system→storage cell' of the 'H-PCS energy storage control mode' indicates a control mode in which the power generated by the solar power generation equipment 10 and the power of the system 2 charge the storage cell 8, and it can be seen that this control mode is realized by prioritizing processing of the control unit to which an identifier '2' in the form of a small Roman numeral has been assigned in FIG. 12, and, when insufficient, by adding control which combines a control unit to which an identifier '1' in the form of a small Roman numeral has been assigned and incorporating a control unit to which an identifier '4' in the form of a small Roman numeral has been assigned in FIG. 12 (control of these control units is performed at the same time).

Note that 'control of the ratio between the small Roman numerals '3' and '4'" in the 'control unit combination' field in FIG. 13 signifies distributing the ratios of the charged amounts based on the capacity and current SOC of the storage cell 8 and built-in storage cell of the electric vehicle 9, for example.

Meanwhile, FIG. 14 shows an example of a single-day time schedule relating to operation modes. In the case of this embodiment, the time zone '0:00' to '5:00' is 'the early hours,' the time zone '5:00' to '8:00' is 'early morning,' the time zone '8:00' to '12:00' is 'morning,' the time zone '12:00' to '14:00' is 'midday,' the time zone '14:00' to '17:00' is 'afternoon,' the time zone '17:00' to '19:00' is 'evening,' and the time zone '19:00' to '24:00' is 'night.' Furthermore, in this embodiment, one operation mode is defined by allocating the control modes described hereinabove with reference to FIG. 12 to each time zone.

FIG. 15B shows a configuration example of several operation modes of the hybrid power conversion apparatus 7 defined as above. The example in FIG. 15B is an example of a case where a total of seven operation patterns to which the identifiers 'EX1' to 'EX7' have been assigned have been defined as operation patterns as shown in FIG. 15A. In FIG. 15B, the operation mode signs 'A' to 'F' which are denoted by large letters of the alphabet are each combined with the controls modes 'a' to 'I' described hereinabove with reference to FIG. 13, and the system control apparatus 21 of the hybrid power conversion apparatus 7 selects a subordinate power apparatus such as the solar power generation equipment 10, storage cell 8, or built-in storage cell of the electric vehicle 9 according to its status, and the selected power apparatus is optimally controlled.

For example, in the operation mode to which the identifier 'A' has been assigned ('DR priority: aggregator indication case'), the hybrid power conversion apparatus 7 (system control apparatus 21) performs autonomous control in an operation mode or control mode according to the second control instruction which has been sent from the aggregation server 12.

Furthermore, in the operation mode to which the identifier 'B' has been assigned ('H-PCS energy storage control mode'), the hybrid power conversion apparatus 7 (system control apparatus 21) exercises control to store energy in a power apparatus which is subordinate to the hybrid power conversion apparatus 7 by charging the storage cell 8 and built-in storage cell of the electric vehicle 9 and the like according to the state of the power generation amount of the solar power generation equipment 10 and the SOC state and chargeable range of the storage cell 8 and built-in storage cell of the electric vehicle 9, and so forth. As the control modes in this case, there exist control modes 'a,' 'b,' 'c,' and 'd.' Details of the control processing will be described hereinbelow.

In the operation mode to which the identifier 'C' has been assigned (the 'H-PCS energy release control mode'), the hybrid power conversion apparatus 7 (system control apparatus 21) exercises control to release the energy stored from power apparatuses which are subordinate to the hybrid power conversion apparatus 7 by discharging from the storage cell 8 and the built-in storage cell of the electric vehicle 9 according to the state of the power generation amount of the solar power generation equipment 10 and the SOC state and dischargeable range of the storage cell 8 and built-in storage cell of the electric vehicle 9, and so forth. As the control modes in this case, there exist control modes 'e,' 'f,' and 'g.' Details of the control processing will be described hereinbelow.

In the operation mode to which the identifier 'D' has been assigned (the 'independent control mode'), the hybrid power conversion apparatus 7 (system control apparatus 21) causes power to be discharged from the storage cell 8 and the built-in storage cell of the electric vehicle 9 during a power outage according to the state of the power generation amount of the solar power generation equipment 10 and the SOC state and dischargeable range of the storage cell 8 and built-in storage cell of the electric vehicle 9, and outputs the discharged power to the independent terminal 51. As the control modes in this case, there exist control modes 'h,' 'i,' 'j,' and 'k.'

In the operation mode ('peak cut') to which the identifier 'E' has been assigned, the hybrid power conversion apparatus 7 (system control apparatus 21) configures an upper limit value for the power input from the system 2, and when the upper limit value is exceeded, uses the 'H-PCS energy release control mode' of 'C' above to discharge the stored energy of a subordinate power apparatus and suppress the power input. As the control modes in this case, there exist control modes 'e,' 'f,' and 'g.'

In the operation mode ('peak shift') to which the identifier 'F' has been assigned, the hybrid power conversion apparatus 7 (system control apparatus 21) causes the power which was input from the system 2 during times when prices were low or when system power is excessive as well as the power generated by the solar power generation equipment 10 to charge the storage cell 8 and built-in storage cell of the electric vehicle 9 by using the 'H-PCS energy storage control mode' of 'B' above and so forth to increase the energy stored in power apparatuses which are subordinate to the hybrid power conversion apparatus 7. As the control modes in this case, there exist control modes 'a,' 'b,' 'c,' and 'd.' During times when prices are high or when there is a shortage of system power, the hybrid power conversion apparatus 7 (system control apparatus 21) uses the 'H-PCS energy release control mode' of 'C' to discharge the stored energy of subordinate power apparatuses and suppress the power input. As the control modes in this case, there exist control modes 'e,' 'f,' and 'g.'

Meanwhile, the operation pattern which has the identifier 'EX1' ('DR priority: aggregator indication case') is an operation pattern in which the hybrid power conversion apparatus 7 (system control apparatus 21) implements autonomous control using an operation mode or control mode according to the second control instruction which has been sent from the aggregation server 12 in all of the time zones 'the early hours,' 'early morning,' 'morning,' 'midday,' 'afternoon,' 'evening,' and 'night.'

However, the operation pattern to which the identifier 'EX2' has been assigned ('daytime H-PCS energy storage control mode, night discharge control mode') is an operation pattern in which the power generated by the solar power generation equipment 10 during the daytime is stored in power apparatuses subordinate to the hybrid power conversion apparatus 7 by means of the foregoing operation 'B' and energy that has been stored during the daytime is discharged during the night by means of the foregoing operation mode 'C.'

Furthermore, the operation pattern to which the identifier 'EX3' has been assigned ('H-PCS energy release control mode') is an operation pattern in which the energy which has been stored by means of the foregoing operation mode 'C' in each of the time zones from 'the early hours' until 'night' is released.

The operation pattern (independent control mode) to which the identifier 'EX4' has been assigned is an operation pattern at the time of a power outage or emergency in which, as a 'power outage/emergency (BCP (Business continuity planning)/LCP (Life continuity planning) contingency, power is provided independently by the consumer 3 by combining any one or two of the solar power generation equipment 10, storage cell 8, and built-in storage cell of the electric vehicle 9 which the consumer 3 owns in all time zones (the value of each field from 'the early hours' until 'night' is 'D').

The operation pattern ('peak cut') to which the identifier 'EX5' has been assigned is an operation pattern in which the start and end times and upper limit power of the system input are configured, control is exercised to satisfy conditions which have been configured by using the foregoing 'H-PCS energy release control mode' of 'C,' and input restrictions for the system power are established.

The operation pattern ('peak shift') to which the identifier 'EX6' has been assigned is an operation pattern in which the 'H-PCS energy storage control mode' of 'B' above is used to configure start and end times and implement charging in the configured time zones, and in which a peak cut is provided by releasing the energy which has been stored in power apparatuses subordinate to the hybrid power conversion apparatus 7 by means of the same procedure as the foregoing 'EX5.'

The operation pattern to which the identifier 'EX7' has been assigned ('original configuration') is an operation pattern which enables the operation mode or control mode in each time zone to be freely configured (the values of all the fields from 'the early hours' until 'night' are 'optional').

(5) Specific Content of the First and Second Control Instructions

The specific content of the first and second control instructions will be explained next. FIG. 16 shows the specific content of the first control instruction which is sent from the power management server 15 (FIG. 3) to the aggregation server 12 (FIG. 3). In FIG. 16, the task field 80A indicates the content of tasks by means of the first control instruction and the control content field 80B shows the control content which is executed by the aggregation server 12 which has received the first control instruction of the corresponding task content. In addition, the response time field 80C shows the time the first control instruction of the corresponding task content is sent from the power management server 15 to the aggregation server 12 and the indicated value field 80D shows the content of indicated values contained in the first control instruction of the corresponding task content. Furthermore, the performance report field 80E shows the content of the results of executing the corresponding first control instruction and for which notification is sent from the aggregation server to the power management server.

As shown in FIG. 16, as task content of the first control instruction, there exist 'peak shift' in which the power consumption amount in a time zone with a high power demand is shifted to another time zone, 'peak cut' in which the power consumption amount in a time zone with a high power demand is reduced, 'demand adjustment 1' in which negawatts are created, 'demand adjustment 2' in which positive watts are created, 'frequency-power control' in which the frequency and power amount of the power in the system 2 are adjusted, 'reactive power control' in which the reactive power is controlled, and 'PV output power flow reversal prevention' in which power flow reversal of solar-generated power at each consumer 3 is prevented.

Furthermore, as a first control instruction which assigns the tasks of 'peak shift' and 'peak cut', a first control instruction in which the start time, control time interval, and capacity (or output) are designated as indicated values is supplied from the power management server 15 to the aggregation server 12 no later than the day before the day when the control is to be exercised, and as a first control instruction which assigns the tasks of 'demand adjustment 1,' 'demand adjustment 2,' and 'PV output power flow reversal prevention,' a first control instruction in which the start time, control time interval, and capacity (or output) are designated as indicated values is supplied from the power management server 15 to the aggregation server 12 no later than a few minutes before the time when the control is to be exercised, for example.

Furthermore, as a first control instruction which assigns the tasks of 'frequency-power control' and 'reactive power control', a first control instruction in which the start time and control time interval are designated as indicated values is supplied from the power management server 15 to the aggregation server 12 in real time.

Meanwhile, FIG. 17 shows the specific content of the second control instruction which the aggregation server 12, to which the first control instruction was issued from the power management server 15, sends to each hybrid power conversion apparatus 7 for which the operation mode with the identifier 'A' in FIG. 15B has been configured by the consumer 3 as the operation mode (hereinafter called the control-target hybrid power conversion apparatuses 7).

The first control instruction which assigns a 'peak shift' or 'peak cut' as task content is supplied from the power management server 15 to the aggregation server 12 the day before and therefore, upon receiving the first control instruction with this task content, the aggregation server 12 sends a second control instruction in which the control mode, control start time, end time and capacity are designated as indicated values to each control-target hybrid power conversion apparatus 7, as shown in FIG. 17.

Specifically, upon receiving a first control instruction in which a 'peak shift' is the task content, the aggregation server 12 sends a second control instruction, in which the control modes which have the identifiers 'a,' 'b,' 'c,' and 'd' in FIG. 13 are designated as the control modes at the time of 'H-PCS energy storage' in which energy is stored in power apparatuses subordinate to the hybrid power conversion apparatus 7, and in which the control start time, end time and capacity are designated as indicated values, to each control-target hybrid power conversion apparatus 7. Likewise, during 'H-PCS energy release' in which the energy stored in power apparatuses subordinate to the hybrid power conversion apparatus 7' is released, the control mode 'e,' 'f,' or 'g' is designated. Furthermore, upon receiving a first control instruction in which a 'peak cut' is the task content, the aggregation server 12 sends a second control instruction in which the control modes which have the identifiers 'e,' 'f,' and 'g' in FIG. 13 are designated as the 'H-PCS energy release control mode' and in which the control start time, end time and capacity are designated as indicated values to each control-target hybrid power conversion apparatus 7.

Furthermore, the first control instruction which assigns 'demand adjustment 1,' 'demand adjustment 2,' 'frequency-power control,' 'reactive power control' or 'PV output power flow reversal prevention' as task content is supplied from the power management server 15 to the aggregation server 12 a few minutes before the start time or in real time, for example, and therefore, upon receiving the first control instruction with the foregoing task content, the aggregation server 12 sends a second control instruction in which the control mode is designated and the control start time, end time and capacity are designated as indicated values to each control-target hybrid power conversion apparatus 7.

Upon receiving a first control instruction in which 'demand adjustment 1' is the task content, the aggregation server 12 sends a second control instruction in which a control mode which has the identifier 'a,' 'b,' 'c,' or 'd' in FIG. 13 is designated as the 'H-PCS energy storage control mode' and in which the control start time and end time or the charging start time, end time and charged amount are designated as indicated values to each control-target hybrid power conversion apparatus 7.

Upon receiving a first control instruction in which 'demand adjustment 2' is the task content, the aggregation server 12 sends a second control instruction in which a control mode which has the identifier 'e,' 'f,' or 'g' is designated as the 'H-PCS energy release control mode' and in which the control start time, end time and capacity are designated as indicated values to each control-target hybrid power conversion apparatus 7.

Moreover, upon receiving a first control instruction in which 'frequency-power control' is the task content, the aggregation server 12 sends a second control instruction in which a control mode which has the identifier 'a,' 'b,' 'c,' or 'd' in FIG. 13 is designated for storage and a control mode which has the identifier 'e,' 'f,' or 'g' in FIG. 13 is designated for release, as the 'H-PCS energy control mode' and in which the control start time, end time and capacity are designated as indicated values, to each control-target hybrid power conversion apparatus 7. Note that each hybrid power conversion apparatus 7 which has received the second control instruction performs storage or release in response to frequency variations or power variations according to a preregistered graph.

Furthermore, upon receiving a first control instruction in which 'reactive power control' is the task content, the aggregation server 12 sends a second control instruction in which a control mode which has the identifier 'I' in FIG. 13 is designated as the control mode to each control-target hybrid power conversion apparatus 7.

(6) Flow of Autonomous Control by a Hybrid Power Conversion Apparatus (6-1) Overall Flow FIG. 18 shows the flow of processing in which the hybrid power conversion apparatus 7 according to this embodiment autonomously controls each power apparatus of the consumer 3 to a state according to a second control instruction based on the second control instruction which is supplied from the aggregation server 12 at predetermined time intervals (every 30 minutes).

In the foregoing case, each consumer 3 who has established a demand response contract with the aggregator 11 suitably configures conditions (hereinafter called autonomous control conditions) enabling its own hybrid power conversion apparatus 7 to control each power apparatus by using the respective communication terminal apparatuses 30. The autonomous control conditions which are to be configured here are the possible charging-discharging range (upper limit value and lower limit value of SOC) and the charged power value and discharged power value of the storage cell 8, the possible charging-discharging range (upper limit value and lower limit value of SOC) and the charged power value and discharged power value of the built-in storage cell of the electric vehicle 9, the charging-discharging priority rankings of the storage cell 8 and built-in storage cell of the electric vehicle 9, and the prediction value for the power usage amount every 30 minutes for several hours thereafter. Furthermore, the communication terminal apparatus 30 sends autonomous control conditions thus configured by the consumer 3 to the EMS 20 (SP1).

The EMS 20 calculates information required (a prediction value every 30 minutes, for example) to update the possible output value management table 73 described hereinabove with reference to FIG. 9 and possible input value management table 74 described hereinabove with reference to FIG. 10 based on the autonomous control conditions sent from the communication terminal apparatus 30, and sends the calculated information to the aggregation server 12 as prediction information (SP2).

In reality, when these autonomous control conditions are being sent from the communication terminal apparatus 30, the EMS 20 calculates several hours' worth of the power amount which can be output to the system 2 from the storage cell 8 and built-in storage cell of the electric vehicle 9 every 30 minutes thereafter based on the prediction values for the power usage amount every 30 minutes for several hours thereafter which are included in the autonomous control conditions, and calculates several hours' worth of the power amount which can be input to charge the storage cell 8 and built-in storage cell of the electric vehicle 9 every 30 minutes thereafter.

Furthermore, the EMS 20 sends these calculated power amounts to the aggregation server 12 as prediction information together with the power amount which the consumer 3 is currently outputting to the system 2 and the power amount which the consumer 3 is currently inputting from the system 2, and the power amount which can currently be discharged to the system 2 from the storage cell 8 and built-in storage cell of the electric vehicle 9 and the capacity with which the storage cell 8 and the like can currently be charged.

The aggregation server 12 which has received this prediction information updates the possible output value management table 73 (FIG. 9) and possible input value management table 74 (FIG. 10) based on the foregoing prediction information (SP3). Note that, as described hereinabove, the possible output value management table 73 and possible input value management table 74 are also updated by means of the period information (FIG. 6) which is sent from the hybrid power conversion apparatus 7 of each consumer 3 to the aggregation server 12 every 30 minutes.

Furthermore, the EMS 20 then sends the autonomous control conditions received in step SP2 to the system control apparatus 21 (SP4) and registers these same conditions in the system control apparatus 21.

The processing thus far is executed each time the consumer 3 updates the autonomous control conditions by using the communication terminal apparatus 30.

Meanwhile, the power management server 15 sends a first control instruction in which the task to be executed within the limits managed by the aggregation server 12, the task start time, control time and capacity are designated to the aggregation server 12 at regular intervals (every 30 minutes, for example) (SP5).

Furthermore, the aggregation server 12 which has received the first control instruction calculates the power amounts allocated to each consumer 3 within the limits managed by the aggregation server 12 to execute the task designated in the first control instruction (the upper limit value of the power input from the system 2 and lower limit value of the power to be output to the system 2) by referencing the possible output value management table 73, possible input value management table 74 and, where necessary, the consumer initial registration information database 71 and period acquisition information management database 72 and the like respectively (SP6). Note that the consumers 3 targeted here are only the consumers 3 for whom the operation pattern with the identifier 'EX1' in FIG. 15A has been configured as the operation mode of the hybrid power conversion apparatus 7 at this time.

Moreover, for each of the corresponding consumers 3, the aggregation server 12 generates a second control instruction in which the operation mode or control mode corresponding to the task designated in the first control instruction is designated and in which the allocation amount of the consumer 3 calculated as described hereinabove and the start time and end time of this operation mode or control mode are designated as designation values, and sends this generated second control instruction to the EMS 20 of the hybrid power conversion apparatus 7 of the consumer 3 (SP7). Furthermore, upon receiving the second control instruction, the EMS 20 transfers the operation mode or control mode and indicated values which are contained in the second control instruction to the system control apparatus 21 as control information (SP8).

Upon receiving this control information, the system control apparatus 21 executes autonomous control processing which controls the operation of the required apparatuses among the storage cell charging-discharging apparatus 23 (FIG. 3), EV charging-discharging apparatus 24 (FIG. 3) and solar power conversion apparatus (FIG. 3) to satisfy the conditions of the indicated values designated in the control information in the operation mode or control mode which was designated in the control information (SP9).

More specifically, the system control apparatus 21 operates the charging-discharging apparatus and power conversion apparatus required in the operation mode or control mode which was designated in the control information. Moreover, at this time, when the indicated values are included in the control information, the system control apparatus 21 operates the corresponding power apparatuses so that the power amount which is input from the system 2 is equal to or smaller than the indicated allocation amount and the power amount which is output to the system 2 is equal to or larger than the indicated allocation amount.

Moreover, at this time, the system control apparatus 21 causes the storage cell charging-discharging apparatus 23 (FIG. 3), EV charging-discharging apparatus 24 (FIG. 3) and solar power conversion apparatus (FIG. 3) to calculate the required data such as the discharged power amounts from the storage cell 8 and built-in storage cell of the electric vehicle 9 and the power generation amount of the solar power generation equipment 10 (SP10). Furthermore, when the next indicated value is supplied before long via the EMS 20 from the aggregation server 12 (30 minutes thereafter, for example), the system control apparatus 21 generates the period information described hereinabove with reference to FIG. 6 based on prior measurement results and sends the generated period information to the EMS 20 (SP11).

Upon receiving this period information, the EMS 20 transfers this period information to the aggregation server 12 (SP12). Thus, the aggregation server 12 aggregates the discharging adjustment amount or charging adjustment amount of the consumer in this period based on this period information and updates the period acquisition information management database 72 (FIG. 7) and performance value table 75 (FIG. 11) respectively based on the aggregation result (SP13).

Furthermore, the EMS 20 also transfers the received period information to the communication terminal apparatus 30 (SP14). Thus, the communication terminal apparatus 30 aggregates the period information like the aggregation server 12 and displays the required information including the aggregation results (SP15).

Note that the processing of steps SP5 to SP15 is repeated in each cycle (30-minute cycle) in which the power management server 15 (FIG. 3) sends the first control instruction to the aggregation server 12.

(6-2) System Input Power Suppression Processing

Figure 19A:
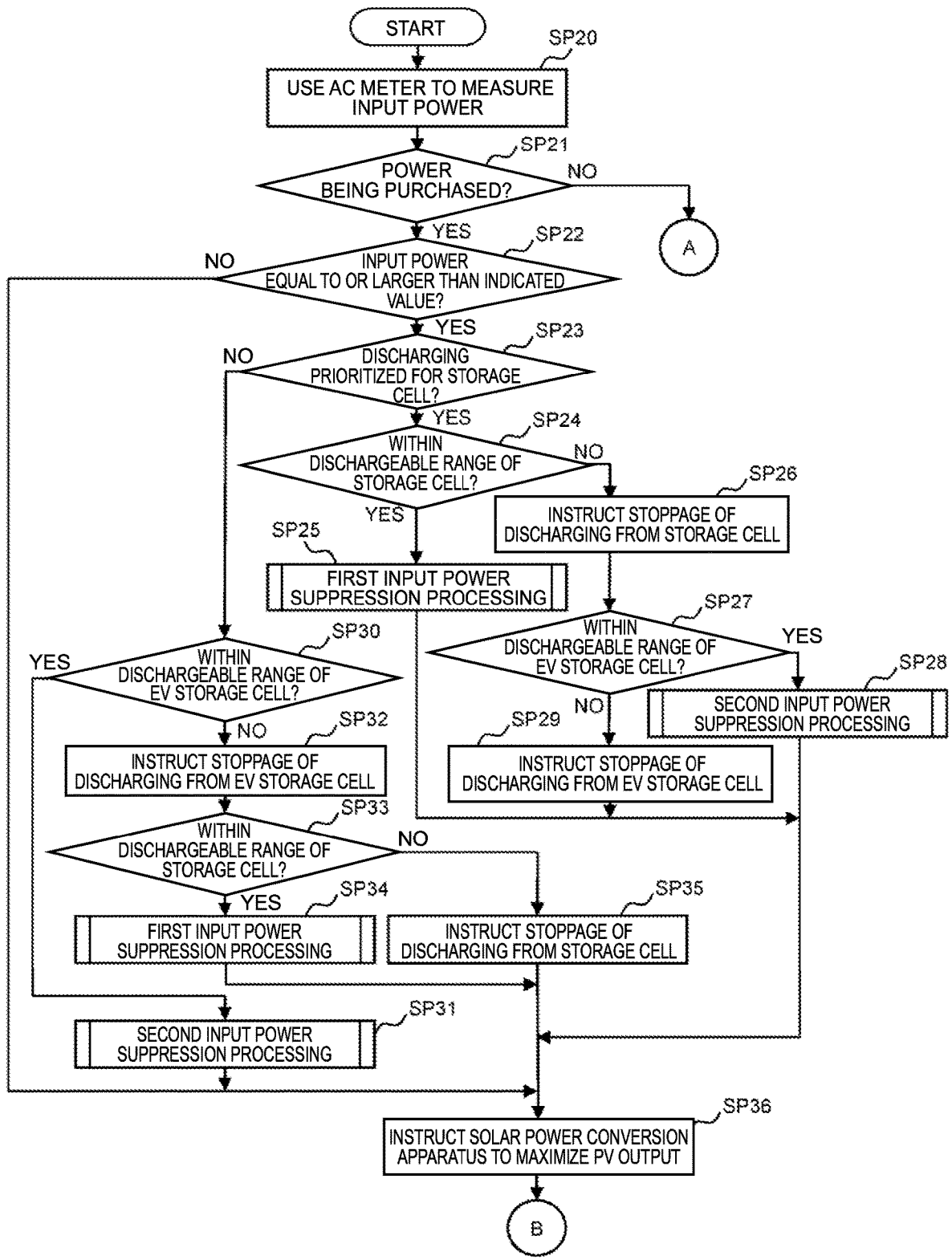
FIG. 19A is a flowchart showing the process steps of system input power suppression processing.
Figure 19B:
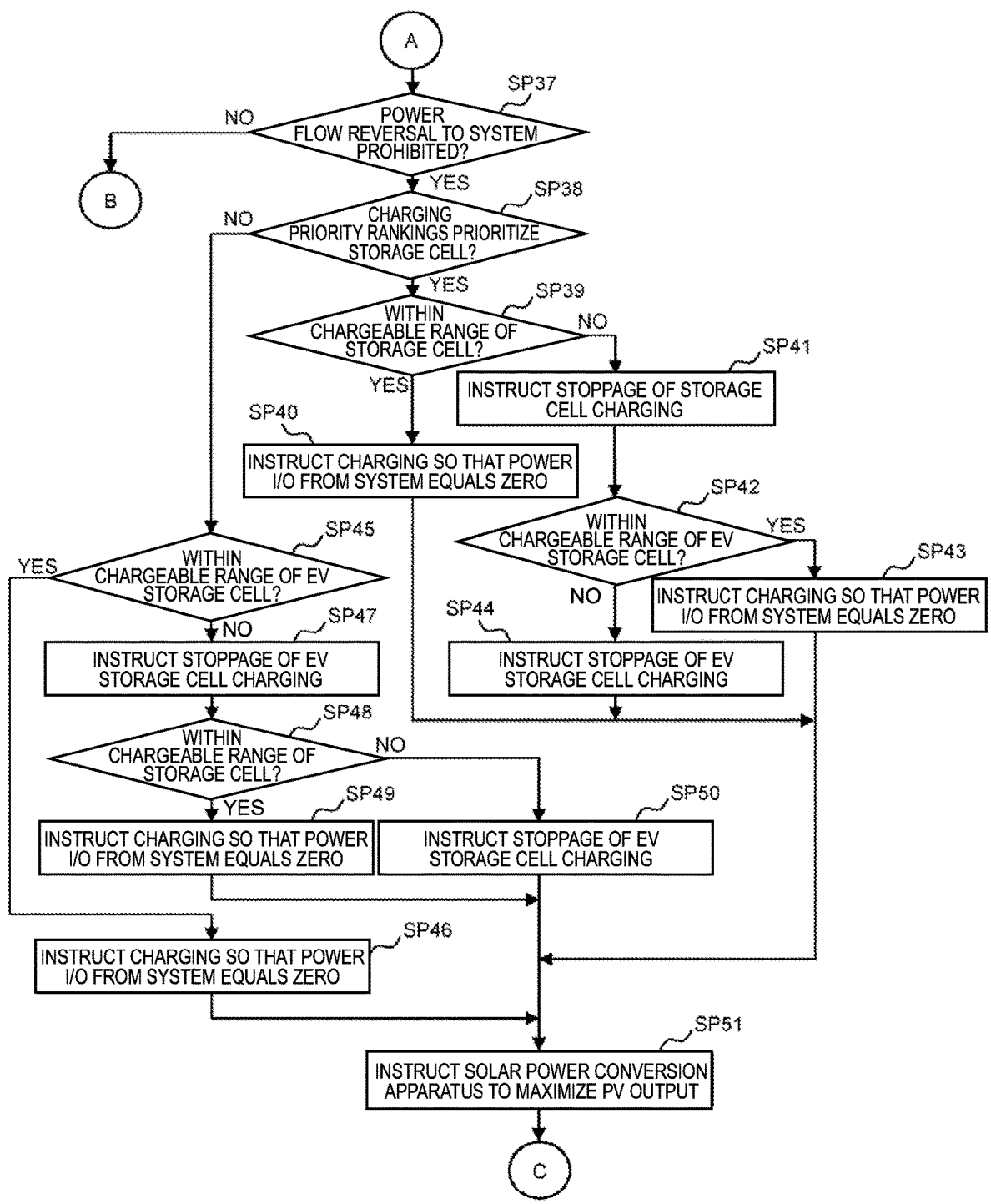
FIG. 19B is a flowchart showing the process steps of system input power suppression processing.
Figure 19C:
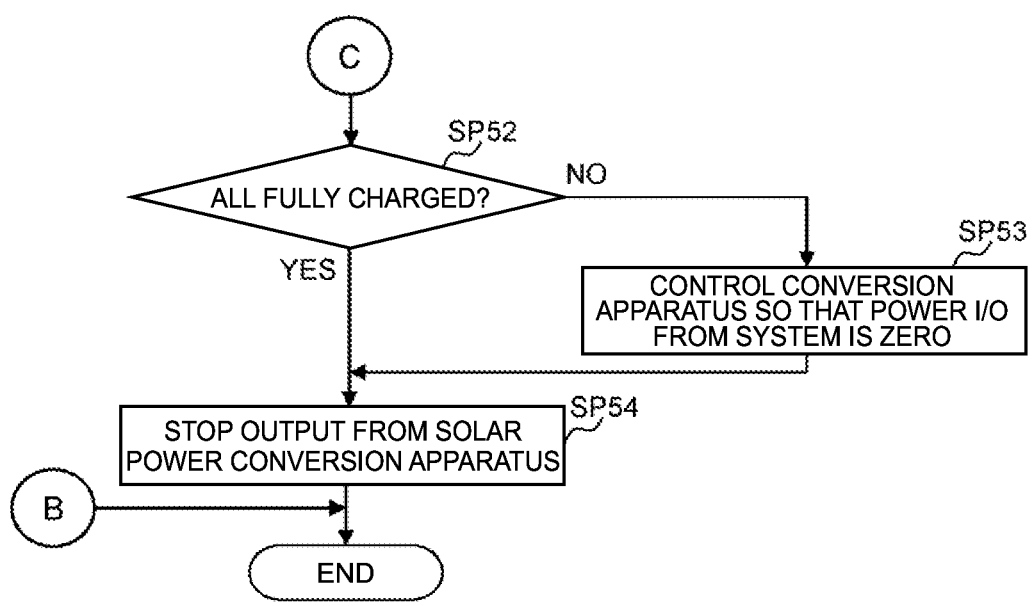
FIG. 19C is a flowchart showing the process steps of system input power suppression processing.

FIGS. 19A to 19C show the process steps of system input power suppression processing which is executed by the system control apparatus 21 of the hybrid power conversion apparatus 7 when there is a power input restriction indication from the aggregator and the operation mode 'A' in FIG. 15B has been designated, for example, in the second control instruction sent from the aggregation server 12 to the hybrid power conversion apparatus 7.

The second control instruction which has been sent from the aggregation server 12 to the hybrid power conversion apparatus 7 as mentioned hereinabove is supplied to the system control apparatus 21 via the EMS 20. Furthermore, when this second control instruction is issued, the system control apparatus 21 starts the system input power suppression processing shown in FIGS. 19A to 19C and first uses the AC meter 4 to measure the power amount which the hybrid power conversion apparatus 7 is currently inputting from the system 2 (SP20).

Thereafter, the system control apparatus 21 determines whether the hybrid power conversion apparatus 7 is currently purchasing power based on the measurement results of step SP20 (whether the power amount measured in step SP20 is positive) (SP21). If a negative result is obtained in this determination, that is, if power is being output, the system control apparatus 21 determines that the DR suppression condition is satisfied and then advances to step SP37.

However, when an affirmative result is obtained in the determination of step SP21, the system control apparatus 21 controls the storage cell charging-discharging apparatus 23 (FIG. 3), EV charging-discharging apparatus 24 (FIG. 3) and/or solar power conversion apparatus 25 (FIG. 3) so that the power which the hybrid power conversion apparatus 7 inputs from the system 2 is equal to or less than the DR indicated value (hereinafter called the system power suppression value) which was designated as an indicated value in the second control instruction by discharging from the storage cell 8 or built-in storage cell of the electric vehicle 9 to the DC bus 22 or controlling the power output of the solar power generation equipment 10 to the DC bus 22 (SP22 to SP36). Consequently, control of the operation mode C in FIG. 15B is provided.

In reality, when a negative result is obtained in the determination of step SP21, the system control apparatus 21 determines whether the power amount which the hybrid power conversion apparatus 7 is inputting from the system 2 at this time is equal to or larger than the system power suppression value designated in the second control instruction (SP22). Then, upon obtaining a negative result in this determination, that is, a result which satisfies the DR suppression, the system control apparatus 21 advances to step SP36.

However, upon obtaining an affirmative result in the determination of step SP22, the system control apparatus 21 determines whether a higher discharging priority ranking has been configured for the storage cell 8 than for the built-in storage cell of the electric vehicle 9 (SP23).

Furthermore, upon obtaining an affirmative result in this determination, the system control apparatus 21 determines whether the designated system power suppression value is within the range of power amounts which the storage cell 8 is capable of discharging (SP24). Upon obtaining an affirmative result in this determination, the system control apparatus 21 executes first input power suppression processing which supplies an indication to the bidirectional AC/DC converter 29 (FIG. 3) to suppress the power input from the system 2 until same equals the system power suppression value designated in the second control instruction and supplies an indication to the storage cell charging-discharging apparatus 23 to discharge the required power from the storage cell 8 so that the voltage of the DC bus 22 equals a preconfigured voltage (hereinafter called the DC bus specified voltage) (SP25) and then advances to step SP36.

However, upon obtaining a negative result in the determination of step SP24, the system control apparatus 21 supplies an indication to the storage cell charging-discharging apparatus 23 to stop discharging from the storage cell 8 (SP26). Moreover, the system control apparatus 21 determines whether the system power suppression value designated by the second control instruction is within the range of power amounts which the built-in storage cell of the electric vehicle 9 is capable of discharging (SP27).

Upon obtaining an affirmative result in this determination, the system control apparatus 21 executes second input power suppression processing (SP28) which supplies an indication to the bidirectional AC/DC converter 29 (FIG. 3) to suppress the power input from the system 2 until same equals the system power suppression value designated in the second control instruction and supplies an indication to the EV charging-discharging apparatus 24 to discharge the required power amount from the built-in storage cell of the electric vehicle 9 so that the voltage of the DC bus 22 equals a preconfigured voltage (hereinafter called the DC bus specified voltage) and then advances to step SP36. Moreover, upon obtaining a negative result in the determination of step SP27, the system control apparatus 21 supplies an indication to the EV charging-discharging apparatus 24 to stop the discharging from the built-in storage cell of the electric vehicle 9 (SP29) and then advances to step SP36.

However, upon obtaining a negative result in the determination of step SP23, the system control apparatus 21 determines whether the system power suppression value designated by the second control instruction lies within the range of power amounts which the built-in storage cell of the electric vehicle 9 is capable of discharging (SP30). Upon obtaining an affirmative result in this determination, the system control apparatus 21 executes the second input power suppression processing (SP31) as per step SP25 and then advances to step SP36.

However, upon obtaining a negative result in the determination of step SP30, the system control apparatus 21 supplies an indication to the EV charging-discharging apparatus 24 to stop discharging from the built-in storage cell of the electric vehicle 9 (SP32) and then determines whether the system power suppression value designated by the second control instruction lies within the range of power amounts which the storage cell 8 is capable of discharging (SP33).

Upon obtaining an affirmative result in this determination, the system control apparatus 21 executes the first input power suppression processing (SP34) as per step SP28 and then advances to step SP36. Moreover, upon obtaining a negative result in the determination of step SP33, the system control apparatus 21 supplies an indication to the storage cell discharge-discharging apparatus 23 to stop the discharging from the storage cell 8 (SP35) and then advances to step SP36.

Thereafter, the system control apparatus 21 supplies an indication to the solar power conversion apparatus 25 to maximize the output amount of the power generated by the solar power generation equipment 10 to the DC bus 22 (SP36) and then ends the system input power suppression processing.

However, when a negative result is obtained in the determination of step SP21, the hybrid power conversion apparatus 7 is currently not making an input (power purchase) from the system 2, rather, surplus power is being generated by the power generation of the solar power generation equipment 10 and it is possible that this surplus power is being output (sold) to the system 2. Therefore, in the foregoing case, the system control apparatus 21 determines in advance whether power flow reversal from the hybrid power conversion apparatus 7 to the system 2 is prohibited (SP37). Then, upon obtaining a negative result in this determination, the system control apparatus 21 ends the system input power suppression processing.

However, when an affirmative result is obtained in the determination of step SP37, the system control apparatus 21 controls the storage cell charging-discharging apparatus 23, EV charging-discharging apparatus 24 and/or solar power conversion apparatus 25 so that the surplus power charges the storage cell 8 or the built-in storage cell of the electric vehicle 9 or to maximize the output of power generated by the solar power generation equipment 10 to the DC bus 22 so that no power flow reversal to the system is generated, (SP38 to SP54) and as a result exercises the control of operation B in FIG. 15B.

In reality, upon obtaining an affirmative result in the determination of step SP37, the system control apparatus 21 determines whether a higher charging priority ranking has been configured for the storage cell 8 than for the built-in storage cell of the electric vehicle 9 (SP38).

Furthermore, upon obtaining an affirmative result in this determination, the system control apparatus 21 determines whether the surplus power amount is within the range of power amounts with which the storage cell 8 can be charged (SP39). Upon obtaining an affirmative result in the determination, the system control apparatus 21 supplies an indication to the storage cell charging-discharging apparatus 23 to raise the charging voltage of the storage cell 8 until the power I/O to/from the system 2 equals zero (SP40) and then advances to step SP51.

However, upon obtaining a negative result in the determination of step SP39, the system control apparatus 21 supplies an indication to the storage cell charging-discharging apparatus 23 to stop charging the storage cell 8 (SP41) and then determines whether the surplus power amount lies within the range of power amounts with which the built-in storage cell of the electric vehicle 9 can be charged (SP42). Upon obtaining an affirmative result in the determination, the system control apparatus 21 supplies an indication to the EV charging-discharging apparatus 24 to raise the charging voltage of the built-in storage cell of the electric vehicle 9 until the power I/O to/from the system 2 equals zero (SP43) and then advances to step SP51. Moreover, upon obtaining a negative result in the determination of step SP42, the system control apparatus 21 supplies an indication to the EV charging-discharging apparatus 24 to stop charging the built-in storage cell of the electric vehicle 9 (SP44) and then advances to step SP51.

However, upon obtaining a negative result in the determination of step SP38, the system control apparatus 21 determines whether the surplus power amount lies within the range of power amounts with which the built-in storage cell of the electric vehicle 9 can be charged (SP45). Furthermore, upon obtaining an affirmative result in the determination, the system control apparatus 21 supplies an indication to the EV charging-discharging apparatus 24 to raise the charging voltage of the built-in storage cell of the electric vehicle 9 until the power I/O to/from the system 2 equals zero (SP46) and then advances to step SP51.

However, upon obtaining a negative result in the determination of step SP45, the system control apparatus 21 supplies an indication to the EV charging-discharging apparatus 24 to stop charging the built-in storage cell of the electric vehicle 9 (SP47) and then determines whether the surplus power amount lies within the range of power amounts with which the storage cell 8 can be charged (SP48).

Upon obtaining an affirmative result in the determination, the system control apparatus 21 supplies an indication to the storage cell charging-discharging apparatus 23 to raise the charging voltage of the storage cell 8 until the power I/O to/from the system 2 equals zero (SP49) and then advances to step SP51. However, upon obtaining a negative result in the determination of step SP48, the system control apparatus 21 supplies an indication to the storage cell charging-discharging apparatus 23 to stop charging the storage cell 8 (SP50) and then advances to step SP51.

Further, upon advancing to step SP51, the system control apparatus 21 supplies an indication to the solar power conversion apparatus 25 to maximize the output amount of the power generated by the solar power generation equipment 10 to the DC bus 22 (SP51).

Thereafter, the system control apparatus 21 issues an inquiry to the storage cell charging-discharging apparatus 23 about the SOC of the storage cell 8 and an inquiry about the SOC of the built-in storage cell of the electric vehicle 9 to the EV charging-discharging apparatus 24 and, based on the responses to these inquiries from the storage cell charging-discharging apparatus 23 and EV charging-discharging apparatus 24, determines whether both the storage cell 8 and the built-in storage cell of the electric vehicle 9 are fully charged (SP52).

Furthermore, upon obtaining a negative result in this determination, the system control apparatus 21 supplies an indication to the storage cell charging-discharging apparatus 23 and EV charging-discharging apparatus 24 to charge the storage cell 8 or built-in storage cell of the electric vehicle 9 which is not fully charged until the power I/O to/from the system 2 is zero (SP53).

Furthermore, when both the storage cell 8 and built-in storage cell of the electric vehicle 9 are fully charged before long, the system control apparatus 21 supplies an indication to the solar power conversion apparatus 25 to stop the output of power generated by the solar power generation equipment 10 to the DC bus 22 (SP54) and then ends the system input power suppression processing.

(6-3) System Power Output Processing

Figure 20A:
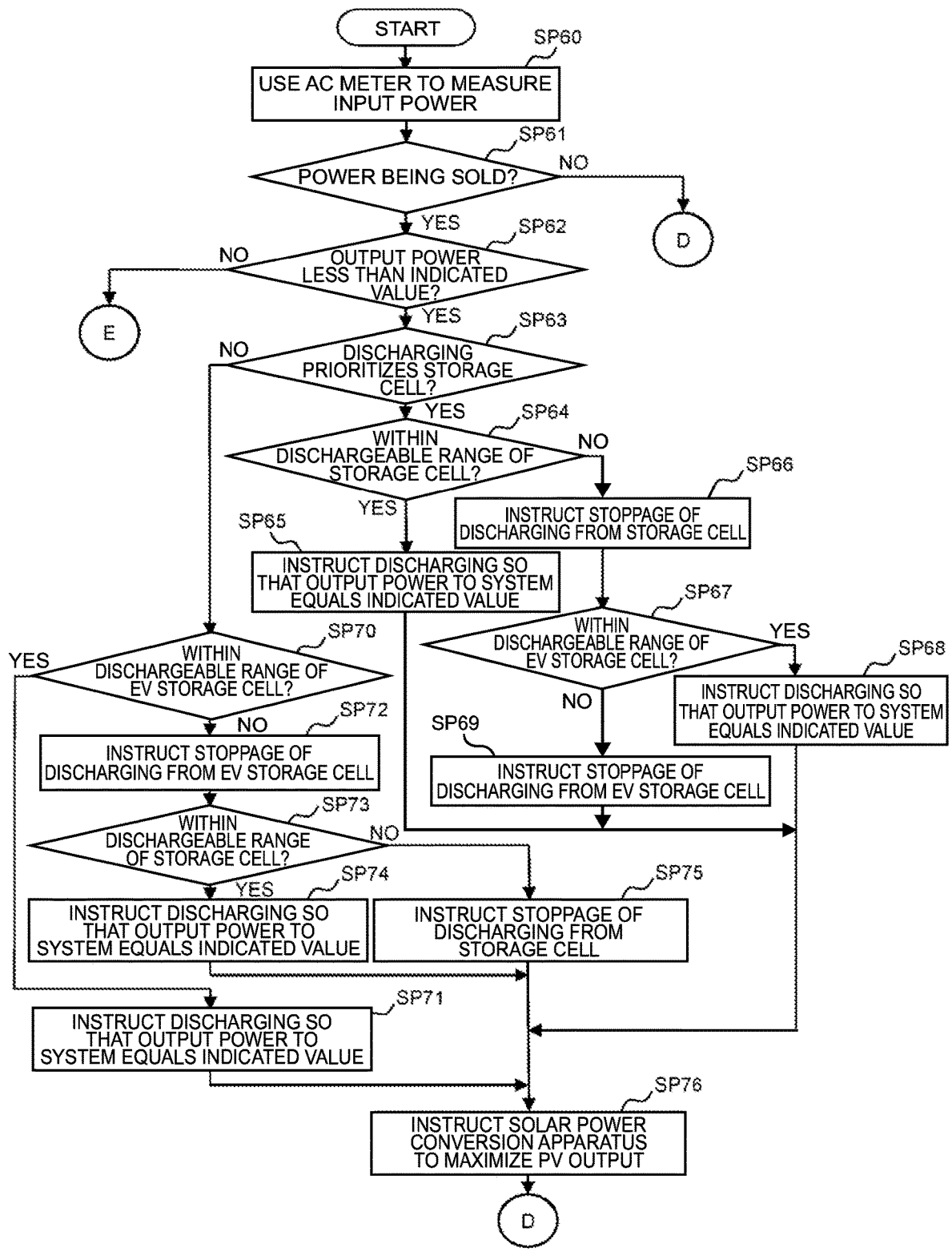
FIG. 20A is a flowchart showing the process steps of system power output processing.
Figure 20B:
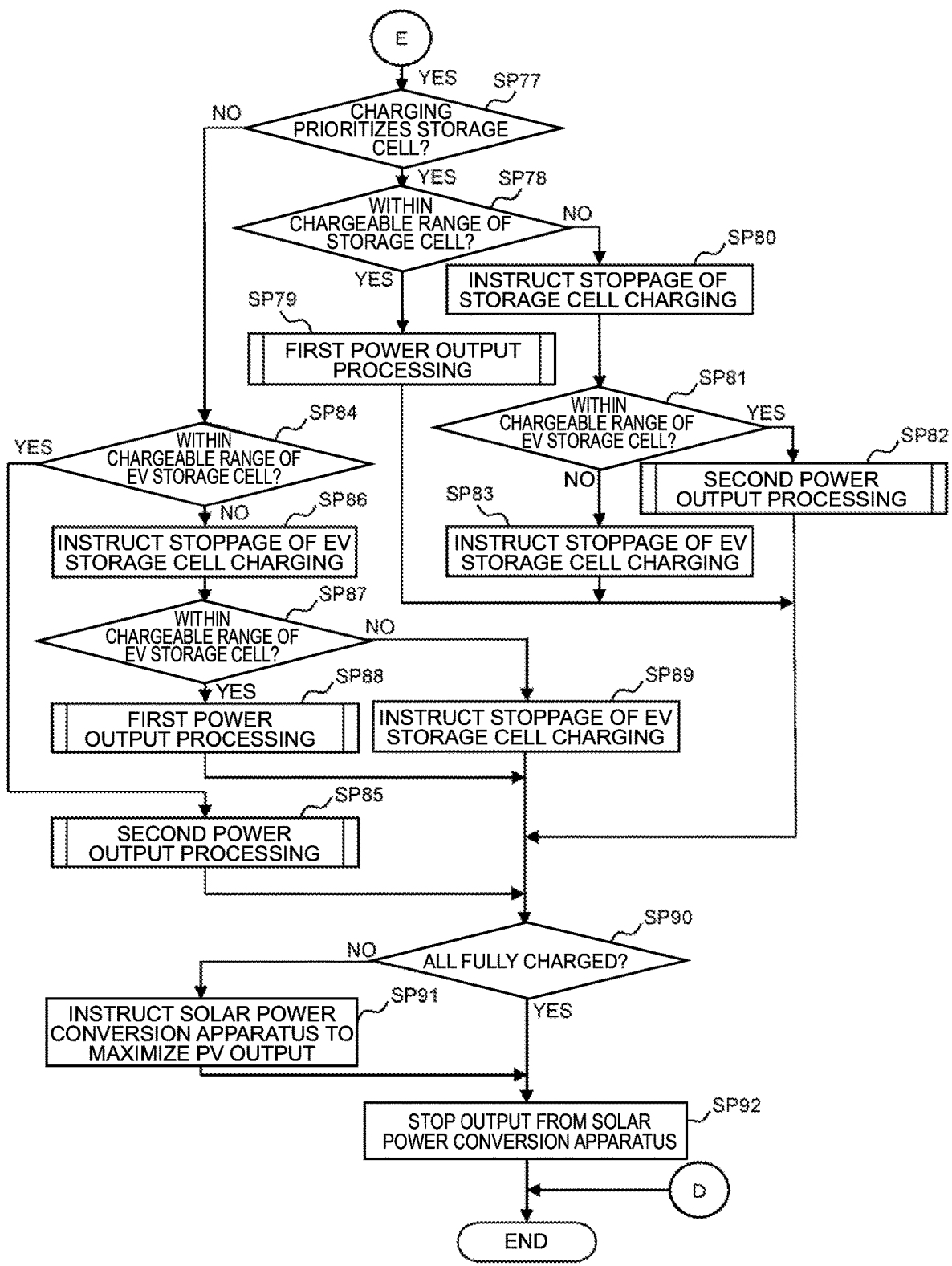
FIG. 20B is a flowchart showing the process steps of system power output processing.

Meanwhile, FIGS. 20A and 20B show the process steps of system power output processing which is executed by the system control apparatus 21 of the hybrid power conversion apparatus 7 when there is a power output indication from the aggregator and the operation mode 'C' in FIG. 15B has been designated, for example, in the second control instruction sent from the aggregation server 12 to the hybrid power conversion apparatus 7.

The second control instruction which has been sent from the aggregation server 12 to the hybrid power conversion apparatus 7 as mentioned hereinabove is supplied to the system control apparatus 21 via the EMS 20. Furthermore, when this second control instruction is issued, the system control apparatus 21 first uses the AC meter 4 (FIG. 3) to measure the power amount which the hybrid power conversion apparatus 7 is currently inputting from the system 2 (SP60).

Thereafter, the system control apparatus 21 determines whether the hybrid power conversion apparatus 7 is currently selling power based on the measurement results of step SP60 (whether the power amount measured in step SP60 is negative) (SP61). Then, upon obtaining a negative result in this determination, the system control apparatus 21 ends the system power output processing.

However, when an affirmative result is obtained in the determination of step SP61, the system control apparatus 21 determines whether the power amount of the power which is being output to the system 2 is less than the capacity which was designated as an indicated value in the second control instruction (hereinafter called the output indicated value (SP62). Furthermore, upon obtaining a negative result in this determination, the system control apparatus 21 advances to step SP77.

However, when an affirmative result is obtained in the determination of step SP62, the system control apparatus 21 controls the storage cell charging-discharging apparatus 23, EV charging-discharging apparatus 24 and/or solar power conversion apparatus 25 so that the power output to the system 2 is equal to or more than the output indicated value which was designated by the second control instruction by discharging from the storage cell 8 or built-in storage cell of the electric vehicle 9 to the DC bus 22 or outputting the power generated by the solar power generation equipment 10 to the DC bus 22 (SP63 to SP76).

In reality, upon obtaining an affirmative result in the determination of step SP62, the system control apparatus 21 determines whether a higher discharging priority ranking has been configured for the storage cell 8 than for the built-in storage cell of the electric vehicle 9 (SP63).

Furthermore, upon obtaining an affirmative result in this determination, the system control apparatus 21 determines whether the designated output indicated value is within the range of power amounts which the storage cell 8 is capable of discharging (SP64). Upon obtaining an affirmative result in the determination, the system control apparatus 21 supplies an indication to the storage cell charging-discharging apparatus 23 to discharge power from the storage cell 8 until this power equals the output indicated value designated by the second control instruction (SP65) and then advances to step SP76.

However, upon obtaining a negative result in the determination of step SP64, the system control apparatus 21 supplies an indication to the storage cell charging-discharging apparatus 23 to stop discharging from the storage cell 8 (SP66). Moreover, the system control apparatus 21 determines whether the output indicated value designated by the second control instruction is within the range of power amounts which the built-in storage cell of the electric vehicle 9 is capable of discharging (SP67).

Upon obtaining an affirmative result in the determination, the system control apparatus 21 supplies an indication to the EV charging-discharging apparatus 24 to discharge from the built-in storage cell of the electric vehicle 9 until the output indicated value designated by the second control instruction is reached (SP68) and then advances to step SP76. Moreover, upon obtaining a negative result in the determination of step SP67, the system control apparatus 21 supplies an indication to the EV charging-discharging apparatus 24 to stop discharging from the built-in storage cell of the electric vehicle 9 (SP69) and then advances to step SP76.

However, upon obtaining a negative result in the determination of step SP63, the system control apparatus 21 determines whether the output indicated value designated by the second control instruction lies within the range of power amounts which the built-in storage cell of the electric vehicle 9 is capable of discharging (SP70). Furthermore, upon obtaining an affirmative result in the determination, the system control apparatus 21 supplies an indication to the EV charging-discharging apparatus 24 to discharge from the built-in storage cell of the electric vehicle 9 until the output indicated value designated by the second control instruction is reached (SP71) and then advances to step SP76.

However, upon obtaining a negative result in the determination of step SP70, the system control apparatus 21 supplies an indication to the EV charging-discharging apparatus 24 to stop discharging from the built-in storage cell of the electric vehicle 9 (SP72) and then determines whether the output indicated value designated by the second control instruction lies within the range of power amounts which the storage cell 8 is capable of discharging (SP73).

Upon obtaining an affirmative result in the determination, the system control apparatus 21 supplies an indication to the storage cell charging-discharging apparatus 23 to discharge power from the storage cell 8 until the output indicated value designated by the second control instruction is reached (SP74) and then advances to step SP76. Moreover, upon obtaining a negative result in the determination of step SP73, the system control apparatus 21 supplies an indication to the storage cell discharge-discharging apparatus 23 to stop discharging from the storage cell 8 (SP75) and then advances to step SP76.

Thereafter, the system control apparatus 21 supplies an indication to the solar power conversion apparatus 25 to maximize the output amount of the power generated by the solar power generation equipment 10 to the DC bus 22 (SP76) and then ends the system power output processing.

However, when a negative result is obtained in the determination of step SP62, this means that the power value which the hybrid power conversion apparatus 7 is currently outputting to the system 2 is larger than the output indicated value designated by the second control instruction. Therefore, in the foregoing case, the system control apparatus 21 controls the storage cell charging-discharging apparatus 23, EV charging-discharging apparatus 24 and/or solar power conversion apparatus 25 so that the power amount which the hybrid power conversion apparatus 7 is outputting to the system 2 is equal to the output indicated value which was designated by the second control instruction by charging the storage cell 8 or built-in storage cell of the electric vehicle 9 with the surplus power which is the difference between the power value which the hybrid power conversion apparatus 7 is currently outputting to the system 2 and the output indicated value which was designated by the second control instruction (SP77 to SP92).

In reality, upon obtaining an affirmative result in the determination of step SP62, the system control apparatus 21 determines whether a higher charging priority ranking has been configured for the storage cell 8 than for the built-in storage cell of the electric vehicle 9 (SP77).

Furthermore, upon obtaining an affirmative result in this determination, the system control apparatus 21 determines whether the surplus power amount is within the range of power amounts with which the storage cell 8 can be charged (SP78). Upon obtaining an affirmative result in this determination, the system control apparatus 21 executes first power output processing (SP79) which supplies an indication to the bidirectional AC/DC converter 29 (FIG. 3) to output power to the system 2 until same equals the output indicated value designated by the second control instruction and supplies an indication to the storage cell charging-discharging apparatus 23 to charge the storage cell 8 with the required power amount so that the voltage of the DC bus 22 equals a preconfigured voltage (hereinafter called the DC bus specified voltage) and then advances to step SP90.

However, upon obtaining a negative result in the determination of step SP78, the system control apparatus 21 supplies an indication to the storage cell charging-discharging apparatus 23 to stop charging the storage cell 8 (SP80) and then determines whether the surplus power amount lies within the range of power amounts with which the built-in storage cell of the electric vehicle 9 can be charged (SP81).

Upon obtaining an affirmative result in this determination, the system control apparatus 21 executes second power output processing (SP82) which supplies an indication to the bidirectional AC/DC converter 29 (FIG. 3) to output power to the system 2 until same equals the output indicated value designated by the second control instruction and supplies an indication to the EV charging-discharging apparatus 24 to charge the built-in storage cell of the electric vehicle 9 with the required power amount so that the voltage of the DC bus 22 equals a preconfigured voltage (hereinafter called the DC bus specified voltage) and then advances to step SP90. Moreover, upon obtaining a negative result in the determination of step SP81, the system control apparatus 21 supplies an indication to the EV charging-discharging apparatus 24 to stop charging the built-in storage cell of the electric vehicle 9 (SP83) and then advances to step SP90.

However, upon obtaining a negative result in the determination of step SP77, the system control apparatus 21 determines whether the surplus power amount lies within the range of power amounts with which the built-in storage cell of the electric vehicle 9 can be charged (SP84). Further, upon obtaining an affirmative result in this determination, the system control apparatus 21 executes second power output processing (SP85) as per step SP82 and then advances to step SP90.

However, upon obtaining a negative result in the determination of step SP84, the system control apparatus 21 supplies an indication to the EV charging-discharging apparatus 24 to stop charging the built-in storage cell of the electric vehicle 9 (SP86) and then determines whether the surplus power amount lies within the range of power amounts with which the storage cell 8 can be charged (SP87).

Upon obtaining an affirmative result in this determination, the system control apparatus 21 executes first power output processing (SP88) as per step SP79 and then advances to step SP90. However, upon obtaining a negative result in the determination of step SP87, the system control apparatus 21 supplies an indication to the storage cell charging-discharging apparatus 23 to stop charging the storage cell 8 (SP89) and then advances to step SP90.

Thereafter, upon advancing to step SP90, the system control apparatus 21 issues an inquiry to the storage cell charging-discharging apparatus 23 about the SOC of the storage cell 8 and an inquiry about the SOC of the built-in storage cell of the electric vehicle 9 to the EV charging-discharging apparatus 24 and, based on the responses to these inquiries from the storage cell charging-discharging apparatus 23 and EV charging-discharging apparatus 24, determines whether both the storage cell 8 and the built-in storage cell of the electric vehicle 9 are fully charged (SP90).

Upon obtaining a negative result in this determination, the system control apparatus 21 supplies an indication to the solar power conversion apparatus 25 to maximize the output amount of the power generated by the solar power generation equipment 10 to the DC bus 22 (SP91). Furthermore, when both the storage cell 8 and built-in storage cell of the electric vehicle 9 are fully charged before long, the system control apparatus 21 supplies an indication to the solar power conversion apparatus 25 to stop the output of power generated by the solar power generation equipment 10 to the DC bus 22 (SP92) and then ends the system power output processing.

(6-4) Input Power Suppression Processing

Figure 21:
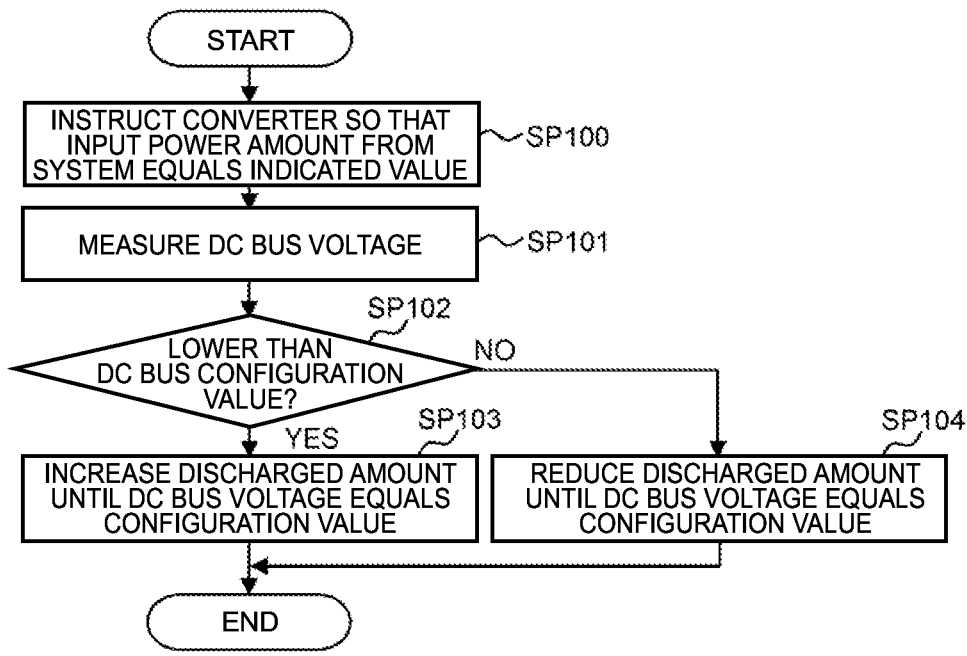
FIG. 21 is a flowchart showing the process steps of input power suppression processing.

FIG. 21 shows the specific processing content of first and second input power suppression processing which is executed by the system control apparatus 21 in steps SP25, SP28, SP31 and SP34 of the system input power suppression processing described hereinabove with reference to FIGS. 19A to 19C.

Upon advancing to step SP25, SP28, SP31 or SP34 of the system input power suppression processing, the system control apparatus 21 starts the input power suppression processing shown in FIG. 21 and first supplies an indication to the bidirectional AC/DC converter 29 (FIG. 3) to suppress the power input from the system 2 until the system power suppression value designated by the second control instruction is reached (SP100).

Thereafter, the system control apparatus 21 causes the bidirectional AC/DC converter 29 to measure the voltage of the DC bus 22 (SP101) and determines whether the voltage of the DC bus 22 is lower than the preconfigured DC bus specified voltage based on this measurement result (SP102).

Furthermore, upon obtaining an affirmative result in this determination, the system control apparatus 21 supplies an indication to the storage cell charging-discharging apparatus 23 (in the case of the first input power suppression processing) or EV charging-discharging apparatus 24 (in the case of the second input power suppression processing) to discharge from the storage cell 8 (in the case of the first input power suppression processing) or built-in storage cell of the electric vehicle 9 (in the case of the second input power suppression processing) so that the voltage of the DC bus 22 equals the DC bus specified voltage (SP103) and then ends the input power suppression processing.

However, upon obtaining a negative result in the determination of step SP102, the system control apparatus 21 supplies an indication to the storage cell charging-discharging apparatus 23 (in the case of the first input power suppression processing) or EV charging-discharging apparatus 24 (in the case of the second input power suppression processing) to reduce the discharge voltage from the storage cell 8 (in the case of the first input power suppression processing) or built-in storage cell of the electric vehicle 9 (in the case of the second input power suppression processing) so that the voltage of the DC bus 22 equals the DC bus specified voltage (SP104) and then ends the input power suppression processing.

(6-5) Power Output Processing

Figure 22:
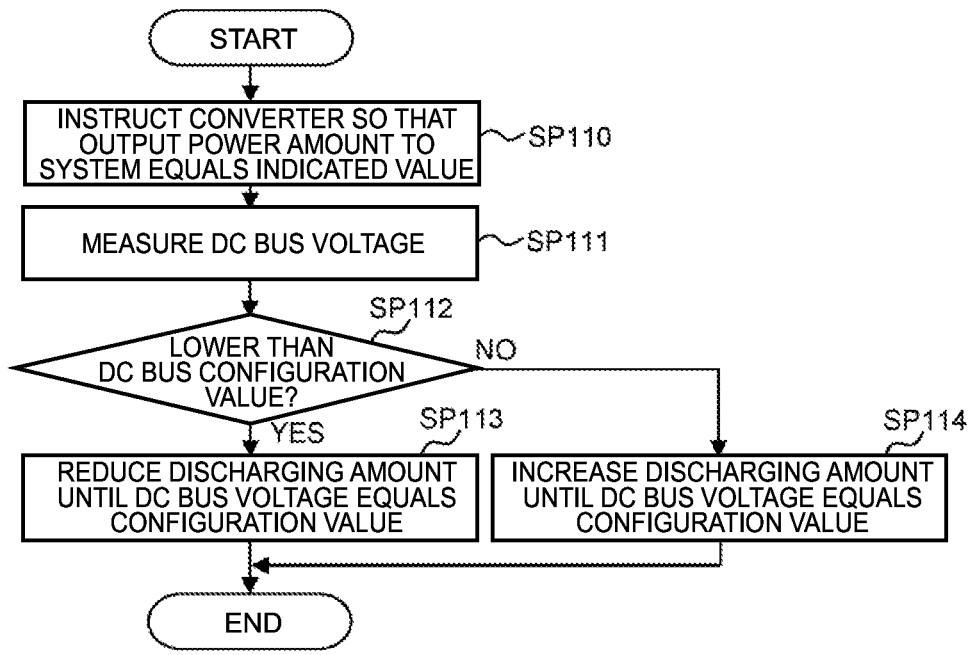
FIG. 22 is a flowchart showing the process steps of system power output processing.

FIG. 22 shows the specific processing content of first and second power output processing which is executed by the system control apparatus 21 in steps SP79, SP82, SP85 and SP88 of the power output control processing described hereinabove with reference to FIGS. 20A and 20B.

Upon advancing to step SP79, SP82, SP85 or SP88 of the system power output processing, the system control apparatus 21 starts the power output control processing control shown in FIG. 22 and first supplies an indication to the bidirectional AC/DC converter 29 (FIG. 3) to output power to the system 2 until the output indicated value designated by the second control instruction is reached (SP110).

Thereafter, the system control apparatus 21 causes the bidirectional AC/DC converter 29 to measure the voltage of the DC bus 22 (SP111) and determines whether the voltage of the DC bus 22 is lower than the preconfigured DC bus specified voltage based on this measurement result (SP112).

Furthermore, upon obtaining an affirmative result in this determination, the system control apparatus 21 supplies an indication to the storage cell charging-discharging apparatus 23 (in the case of the first power output processing) or EV charging-discharging apparatus 24 (in the case of the second power output processing) to suppress charging of the storage cell 8 (in the case of the first power output processing) or built-in storage cell of the electric vehicle 9 (in the case of the second power output processing) until the voltage of the DC bus 22 equals the DC bus specified voltage (SP113) and then ends the power output processing.

However, upon obtaining a negative result in the determination of step SP112, the system control apparatus 21 supplies an indication to the storage cell charging-discharging apparatus 23 (in the case of the first power output processing) or EV charging-discharging apparatus 24 (in the case of the first system power output processing) to suppress charging of the storage cell 8 (in the case of the first system power output processing) or built-in storage cell of the electric vehicle 9 (in the case of the second power output processing) until the voltage of the DC bus 22 equals the DC bus specified voltage (SP114) and then ends the power output processing.

(7) Effect of this Embodiment

As described hereinabove, in the aggregation system 1 according to this embodiment, in response to a first control instruction which is issued from the power management server 15 to the aggregation server 12, the aggregation server 12 sends a second control instruction which designates an operation mode or control mode and an allocation amount of the consumer 3 (an upper limit value of the power which the consumer 3 can input from the system 2 or a lower limit value of the power which the consumer 3 is to output to the system 2) to the hybrid power conversion apparatus 7 of each consumer 3, and the hybrid power conversion apparatus 7 which has received the second control instruction controls required power apparatuses so that the power which is input and output to/from the system 2 equals the allocation amount designated by the second control instruction in the operation mode or control mode designated by the second control instruction.

Therefore, according to the aggregation system 1, the aggregation server 12 does not need to perform control for each consumer 3 and each power apparatus which the consumer 3 owns, rather, the aggregation server 12 is able to execute all of the tasks designated in the first control instruction merely by issuing one second control instruction to each consumer 3, and to the same extent the load on the aggregator side (aggregation server 12) can be markedly reduced.

Moreover, at this time, the aggregation server 12 only designates a predetermined operation mode or control mode and provision amount in the second control instruction and is therefore able to exercise control in power apparatus units for each consumer 3 and, also from the standpoint of the consumers 3 as a whole, is able to execute original operations and more complex operations in addition to a self-sufficient operation or peak shift operation and peak cut operation.

Moreover, according to this aggregation system 1, each hybrid power conversion apparatus 7 issues notification of one week's worth of operation modes which have been configured by the consumer 3 as futures information and therefore the power demand over this period can be easily predicted on the aggregator side and the aggregator is able to perform power control with a surplus.

Furthermore, according to the aggregation system 1, the control instructions to each consumer 3 are issued only to the respective hybrid power conversion apparatuses 7 of the consumers 3, and the hybrid power conversion apparatuses 7 each aggregate the performance, statuses and so forth of the power apparatuses which are subordinate to same and send these performance, statuses and so forth to the aggregation server 12 as performance information (FIG. 5) and period information (FIG. 6), and are thus able to reduce the communication load on the aggregation server 12 and markedly reduce the amount of communication between the aggregation server 12 and each consumer 3.

(8) Other Embodiments

Note that although a case was described according to the foregoing embodiment where the present invention was applied to an aggregation system configured as shown in FIGS. 1 to 3, the present invention is not limited to or by such a case, rather, the present invention can also be applied widely to a VPP system having a variety of other configurations.

Moreover, although in the foregoing embodiment a case was described in which built into one hybrid power conversion apparatus 7 are a control apparatus function which controls charging and discharging of the subordinate power apparatuses based on the second control instruction from the aggregation server 12, and a power conversion apparatus function which converts power which is input from the system 2 from AC to DC and converts the power which is discharged from the power apparatuses to AC and outputs same to the system 2, the present invention is not limited to or by such a case, rather, an apparatus which comprises a control apparatus function (a control apparatus) and an apparatus which comprises a power conversion apparatus function (a power conversion apparatus) may also be provided separately.

INDUSTRIAL APPLICABILITY

The present invention can be widely applied to a VPP system.

REFERENCE SIGNS LIST

1 . . . aggregation system, 2 . . . system, 3 . . . consumer, 4 . . . AC meter, 6 . . . load, 7 . . . hybrid power conversion apparatus 7, 8 . . . storage cell, 9 . . . electric vehicle, 10 . . . solar power generation equipment, 11 . . . aggregator, 12 . . . aggregation server, 15 . . . power management server, 20 . . . EMS, 21 . . . system control apparatus, 29 . . . bidirectional AC/DC converter, 23 . . . storage cell charging-discharging apparatus, 24 . . . EV charging-discharging apparatus, 25 . . . solar power conversion apparatus, 73 . . . possible output value management table, 74 . . . possible input value management table, 75 . . . performance value table.

The invention claimed is:

1. An aggregation system, comprising:
a control apparatus which is provided for each consumer and controls charging and discharging of each of one or more subordinate power apparatuses and power I/O to/from a system respectively; and
a server apparatus which sends a demand response-related control instruction to the control apparatus of each of the consumers respectively, wherein the server apparatus calculates, for each of the consumers and as an allocation amount of the consumer, an upper limit value for the power which the consumer inputs from the system or a lower limit value for the power which the consumer is to output to the system, according to a requested task and power provision amount, and sends the respective control instructions designating the calculated allocation amount of each consumer to the control apparatus of the consumer, wherein the control apparatuses each control the charging and discharging of the corresponding power apparatus so that the power input from the system is equal to or smaller than the allocation amount designated in the control instruction or so that power equal to or larger than the allocation amount is output to the system, wherein the control apparatus is a power conversion apparatus which converts the power that is input from the system from AC to DC and charges the required power apparatus and which converts the power that has been discharged from the power apparatus from DC to AC and outputs the power to the system, wherein the server apparatus designates, in the control instruction and in addition to the allocation amount, a control mode which prescribes a power discharging source and a discharging destination of the power, or an operation mode comprising a combination of a plurality of the control mode, and wherein the control apparatus exercises control to input and output power of the allocation amount designated in the control instruction to/from the system and charge and discharge the corresponding power apparatus by means of the operation mode or control mode designated in the control instruction.

2. The aggregation system according to claim 1, wherein the control apparatus periodically issues notification of the status of each subordinate power apparatus to the server apparatus, and wherein the server apparatus allocates the allocation amount corresponding to the status of each of the power apparatuses notified by each of the control apparatuses to each of the consumers.

3. An aggregation system, comprising:

a control apparatus which is provided for each consumer and controls charging and discharging of each of one or more subordinate power apparatuses and power I/O to/from a system respectively; and a server apparatus which sends a demand response-related control instruction to the control apparatus of each of the consumers respectively, wherein the server apparatus calculates, for each of the consumers and as an allocation amount of the consumer, an upper limit value for the power which the consumer inputs from the system or a lower limit value for the power which the consumer is to output to the system, according to a requested task and power provision amount, and sends the respective control instructions designating the calculated allocation amount of each consumer to the control apparatus of the consumer, wherein the control apparatuses each control the charging and discharging of the corresponding power apparatus so that the power input from the system is equal to or smaller than the allocation amount designated in the control instruction or so that power equal to or larger than the allocation amount is output to the system, wherein the control apparatus is a power conversion apparatus which converts the power that is input from the system from AC to DC and charges the required power apparatus and which converts the power that has been discharged from the power apparatus from DC to AC and outputs the power to the system, wherein a plurality of types of the operation mode are predefined, wherein the consumer is able to configure the desired operation mode for its own control apparatus, and wherein the server apparatus allocates the allocation amount to the consumer of the control apparatus for which an operation mode prioritizing the control instruction from the server apparatus has been configured as the operation mode.

4. An aggregation system control method, which aggregation system comprises a control apparatus which is provided for each consumer and controls charging and discharging of each of one or more subordinate power apparatuses and power I/O to/from a system respectively; and a server apparatus which sends a demand response-related control instruction to the control apparatus of each of the consumers respectively, the aggregation system control method comprising:

a first step in which the server apparatus calculates, for each of the consumers and as an allocation amount of the consumer, an upper limit value for the power which the consumer inputs from the system or a lower limit value for the power which the consumer is to output to the system, according to a requested task and power provision amount, and sends the respective control instructions designating the calculated allocation amount of each consumer to the control apparatus of the consumer, and a second step in which the control apparatuses each control the charging and discharging of the corresponding power apparatus so that the power input from the system is equal to or smaller than the allocation amount designated in the control instruction or so that power equal to or larger than the allocation amount is output to the system, wherein the control apparatus is a power conversion apparatus which converts the power that is input from the system from AC to DC and charges the required power apparatus and which converts the power that has been discharged from the power apparatus from DC to AC and outputs the power to the system, wherein, in the first step, the server apparatus designates, in the control instruction and in addition to the allocation amount, a control mode which prescribes a power discharging source and a discharging destination of the power, or an operation mode comprising a combination of a plurality of the control mode, and wherein, in the second step, the control apparatus exercises control to input and output power of the allocation amount designated in the control instruction to/from the system and charge and discharge the corresponding power apparatus by means of the operation mode or control mode designated in the control instruction.

5. The aggregation system control method according to claim 4, wherein the control apparatus periodically issues notification of the status of each subordinate power apparatus to the server apparatus, and wherein, in the first step, the server apparatus allocates the allocation amount corresponding to the status of each of the power apparatuses notified by each of the control apparatuses to each of the consumers.

6. An aggregation system control method, which aggregation system comprises a control apparatus which is provided for each consumer and controls charging and discharging of each of one or more subordinate power apparatuses and power I/O to/from a system respectively; and a server apparatus which sends a demand response-related control instruction to the control apparatus of each of the consumers respectively, the aggregation system control method comprising:

a first step in which the server apparatus calculates, for each of the consumers and as an allocation amount of the consumer, an upper limit value for the power which the consumer inputs from the system or a lower limit value for the power which the consumer is to output to the system, according to a requested task and power provision amount, and sends the respective control instructions designating the calculated allocation amount of each consumer to the control apparatus of the consumer, and a second step in which the control apparatuses each control the charging and discharging of the corresponding power apparatus so that the power input from the system is equal to or smaller than the allocation amount designated in the control instruction or so that power equal to or larger than the allocation amount is output to the system, wherein the control apparatus is a power conversion apparatus which converts the power that is input from the system from AC to DC and charges the required power apparatus and which converts the power that has been discharged from the power apparatus from DC to AC and outputs the power to the system, wherein a plurality of types of the operation mode are predefined, wherein the consumer is able to configure the desired operation mode for its own control apparatus, and wherein, in the first step, the server apparatus allocates the allocation amount to the consumer of the control apparatus for which an operation mode prioritizing the control instruction from the server apparatus has been configured as the operation mode.

7. A control apparatus which controls charging and discharging of subordinate power apparatuses according to a demand response-related control instruction issued from a high order server apparatus, there existing, subordinate to the control apparatus, one or more power apparatuses which the corresponding owner owns, the control apparatus comprising:

an energy management apparatus which communicates with the server apparatus and which outputs an indication corresponding to the control instruction issued from the server apparatus;

a system control apparatus which controls the required power apparatus among the subordinate one or more power apparatuses according to the indication output from the energy management apparatus; and a power conversion apparatus which converts the power that is input from the system from AC to DC and charges the required power apparatus and which converts the power that has been discharged from the power apparatus from DC to AC and outputs the power to the system, wherein the server apparatus calculates, for each of the consumers and as an allocation amount of the consumer, an upper limit value for the power which the consumer inputs from the system or a lower limit value for the power which the consumer is to output to the system, according to a requested task and power provision amount, and sends the respective control instructions designating the calculated allocation amount of each consumer to the control apparatus of the consumer, wherein the system control apparatus controls the charging and discharging of the corresponding power apparatus so that the power input from the system is equal to or smaller than the allocation amount designated in the control instruction or so that power equal to or larger than the allocation amount is output to the system, wherein the server apparatus designates, in the control instruction and in addition to the allocation amount, a control mode which prescribes a power discharging source and a discharging destination of the power, or an operation mode comprising a combination of a plurality of the control mode, and wherein the control apparatus exercises control to input and output power of the allocation amount designated in the control instruction to/from the system and charge and discharge the corresponding power apparatus by means of the operation mode or control mode designated in the control instruction.

* * * * *